US012691588B2

(12) United States Patent
Matsumoto

(10) Patent No.: US 12,691,588 B2
(45) Date of Patent: Jul. 28, 2026

(54) INFORMATION PROCESSING APPARATUS, INFORMATION PROCESSING METHOD, ROBOT SYSTEM, METHOD FOR MANUFACTURING A PRODUCT, AND RECORDING MEDIUM

(71) Applicant: CANON KABUSHIKI KAISHA, Tokyo (JP)

(72) Inventor: Taishi Matsumoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/883,099

(22) Filed: Sep. 12, 2024

(65) Prior Publication Data

US 2025/0100153 A1 Mar. 27, 2025

(30) Foreign Application Priority Data

Sep. 27, 2023 (JP) ................................. 2023-166528

(51) Int. Cl.
B25J 9/16 (2006.01)
G06T 7/20 (2017.01)
G06T 7/70 (2017.01)

(52) U.S. Cl.
CPC ........... *B25J 9/1697* (2013.01); *B25J 9/1612* (2013.01); *G06T 7/20* (2013.01); *G06T 7/70* (2017.01); *G06T 2207/20081* (2013.01); *G06T 2207/30164* (2013.01)

(58) Field of Classification Search
CPC ........ B25J 9/1697; B25J 9/1612; B25J 9/163; G06T 7/20; G06T 7/70; G06T 2207/20081; G06T 2207/30164; G05B 2219/37555; G05B 2219/39543; G05B 2219/40053
See application file for complete search history.

(56) References Cited

U.S. PATENT DOCUMENTS

| 2017/0282363 | A1* | 10/2017 | Yamada | B25J 9/1612 |
| 2019/0291282 | A1* | 9/2019 | Marchese | B25J 9/1669 |
| 2021/0023711 | A1* | 1/2021 | Lee | B25J 9/163 |
| 2021/0206004 | A1* | 7/2021 | Doi | B25J 15/10 |
| 2022/0288783 | A1* | 9/2022 | Sundermeyer | G06T 7/55 |
| 2022/0318942 | A1 | 10/2022 | Oda | |

FOREIGN PATENT DOCUMENTS

| JP | 2022-21147 A | 2/2022 |
| JP | 2022-87106 A | 6/2022 |
| JP | 2023-15567 A | 2/2023 |
| JP | 2023-148859 A | 10/2023 |

OTHER PUBLICATIONS

U.S. Appl. No. 18/884,338, filed Sep. 13, 2024 by Tomohiro Hara.

* cited by examiner

*Primary Examiner* — Dylan M Katz

(74) *Attorney, Agent, or Firm* — VENABLE LLP

(57) ABSTRACT

An information processing apparatus includes an information processing portion configured to perform information processing. The information processing portion is configured to obtain sensing data from a vision sensor having sensed a workpiece, use the sensing data as input data for a learned model, and obtain, on a basis of the learned model, information of a region including a plurality of positions that are possible positions of a first finger portion among at least two finger portions included in a robot in a case of causing the at least two finger positions to perform a holding operation of holding the workpiece.

31 Claims, 21 Drawing Sheets

100

121 — CPU

122 — ROM

123 — RAM

124 — HDD

127 — PROGRAM

128

125 — RECORDING DISK DRIVE

126 — INTERFACE

200

INFORMATION PROCESSING PORTION

210 — IMAGING CONTROLLER

220 — INFERENCE PORTION

230 — HOLDING POSITION CALCULATION PORTION

REGION INDICATING POSITION OF FINGER PORTION

INFORMATION PROCESSING APPARATUS, INFORMATION PROCESSING METHOD, ROBOT SYSTEM, METHOD FOR MANUFACTURING A PRODUCT, AND RECORDING MEDIUM

BACKGROUND OF THE INVENTION

Field of the Invention

The present disclosure relates to robot technology.

Description of the Related Art

In a system that takes out a workpiece by using a robot, the position of the robot where the workpiece can be held needs to be calculated accurately and quickly.

Japanese Patent Application Laid-Open No. 2022-021147 discloses that a control apparatus determines a gripping position where a gripping apparatus grips an object, by estimating a plurality of gripping candidate positions of the object by using an estimation model using an image as an input, and by referring to the plurality of gripping candidate positions.

SUMMARY OF THE INVENTION

According to a first aspect of the present disclosure, an information processing apparatus includes an information processing portion configured to perform information processing. The information processing portion is configured to obtain sensing data from a vision sensor having sensed a workpiece, use the sensing data as input data for a learned model, and obtain, on a basis of the learned model, information of a region including a plurality of positions that are possible positions of a first finger portion among at least two finger portions included in a robot in a case of causing the at least two finger positions to perform a holding operation of holding the workpiece.

According to a second aspect of the present disclosure, an information processing method for performing information processing includes obtaining sensing data from a vision sensor having sensed a workpiece, using the sensing data as input data for a learned model, and obtaining, on a basis of the learned model, information of a region including a plurality of positions that are possible positions of a first finger portion among at least two finger portions included in a robot in a case of causing the at least two finger positions to perform a holding operation of holding the workpiece.

Further features of the present invention will become apparent from the following description of exemplary embodiments with reference to the attached drawings.

DESCRIPTION OF THE EMBODIMENTS

Figure 1:
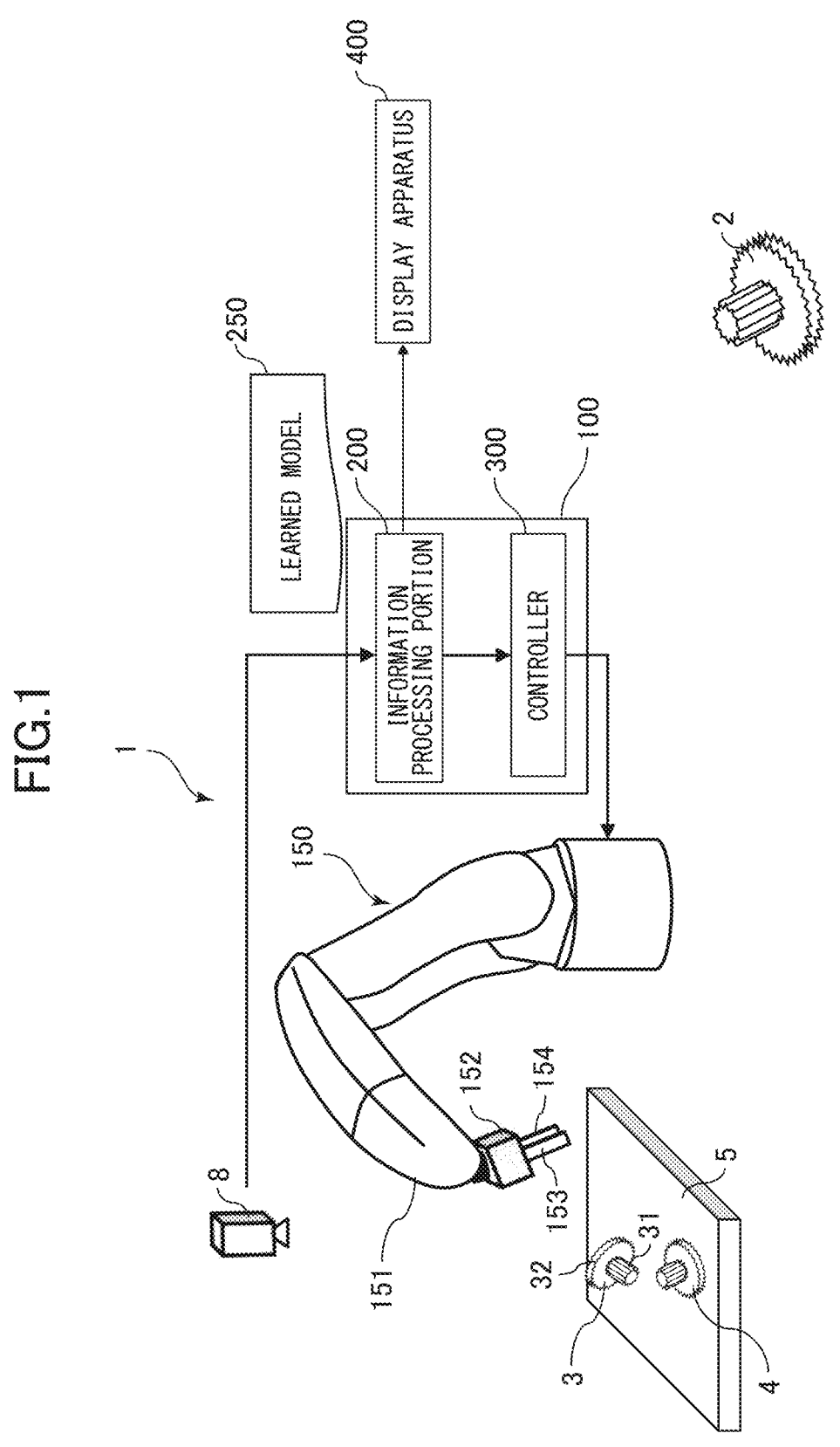
FIG. 1 is an explanatory diagram illustrating a schematic configuration of a robot system according to a first embodiment.

A lot of input data is needed for machine learning in a learning phase. The lot of input data can include two or more pieces of input data that are the same or similar, and the two or more pieces of input data can each have many correct answers. In the case where many correct answers are present for one piece of input data as described above, in the method of Japanese Patent Application Publication No. 2022-021147, a situation in which only some of the many correct answers are associated as correct answer data with the input data or different correct answer data is associated with each piece of two or more pieces of input data can occur, and therefore the precision of the learning is degraded. As a result, the precision of inference in the inference phase is degraded.

For example, there is a case where the workpiece has a cylindrical portion and the workpiece is imaged in a direction orthogonal to a bottom surface of the cylindrical portion. In the case where a captured image obtained by imaging the workpiece in such a direction is used as the input data, all the positions within 360° about the center of the bottom surface of the cylindrical portion serving as a gripping center can be correct answers for gripping positions for two finger portions.

In addition, for example, there is a case where the workpiece includes an upper portion and a lower portion having a width different from the width of the upper portion and the workpiece is imaged in a direction where both the upper portion and the lower portion are captured. In the case where the captured image obtained by imaging the workpiece in such a direction is used as the input data, a plurality of positions such as a position for gripping the upper portion and a position for gripping the lower portion can be correct answers for the gripping positions for the two finger portions.

In the case where a plurality of correct answers are present for the input data and unique correct answer data cannot be determined as described above, the precision of the machine learning is degraded, and as a result of this, the precision of the inference is degraded.

The present disclosure provides a technique advantageous for improving the precision of inference.

Exemplary embodiments of the present disclosure will be described in detail below with reference to drawings. Embodiments below are exemplifications of preferable configurations of the present disclosure, and, for example, details thereof can be appropriately modified by one skilled in the art within the gist of the present disclosure for implementation. In addition, it is assumed that elements denoted by the same reference numerals in the drawings referred to in the description of the embodiments below have substantially the same functions unless otherwise described. In addition, these drawings are schematically expressed for the sake of convenience of illustration and description, the shapes, sizes, and arrangements in the drawings may not be strictly consistent.

First Embodiment

FIG. 1 is an explanatory diagram illustrating a schematic configuration of a robot system 1 according to the first embodiment. The robot system 1 includes a base 5, a vision sensor 8, a robot 150, an information processing apparatus 100, and a display apparatus 400. The information processing apparatus 100 includes an information processing portion 200 that performs information processing, and a controller 300 that controls the robot 150.

The robot 150 is an industrial robot installed in a distribution line or a manufacture line. The robot 150 is a manipulator. For example, the robot 150 is fixed to an unillustrated stand. The base 5 is disposed around the robot 150. A plurality of workpieces can be randomly disposed on the base 5, and in the example of FIG. 1, two workpieces 3 and 4 are placed on the base 5. In the first embodiment, the workpiece 3 and the workpiece 4 are the same kind of workpieces, and have the same shape and size. The workpiece 3 has, for example, an upper portion 31 that is a cylindrical portion having a cylindrical shape, and a lower portion 32 that is a cylindrical portion having a cylindrical shape.

To be noted, an object different from the base 5 may be disposed around the robot 150. In addition, although the workpieces 3 and 4 have the same shape, the workpieces 3 and 4 may have different shapes. In addition, the number of the workpieces placed on the base 5 may be one, three, or more. In the case where a plurality of workpieces are placed on the base 5, the plurality of workpieces may be randomly disposed thereon.

The robot 150 and the information processing apparatus 100 are interconnected directly or via a network in a wired or wireless manner. The vision sensor 8 and the information processing apparatus 100 are interconnected directly or via a network in a wired or wireless manner.

The display apparatus 400 is an example of a display portion. The display apparatus 400 is a display such as a liquid crystal monitor, and is connected to the information processing apparatus 100. To be noted, the display apparatus 400 may be included in the information processing apparatus 100.

The robot 150 includes a robot arm 151 and a robot hand 152 serving as an example of an end effector. The robot arm 151 is, for example, a vertically articulated robot arm. The root end of the robot 150 is a fixed end, and is fixed to an unillustrated stand. The distal end of the robot 150 is a free end. That is, as a result of operating the robot 150, the distal end of the robot 150 moves to an arbitrary position. To be noted, the robot arm 151 is not limited to a vertically articulated robot arm as long as the robot arm 151 has a degree of freedom required for causing the robot hand 152 to hold the workpiece 3 or 4. For example, the robot arm 151 may be an orthogonal robot, a parallel link robot, or a selective compliance assembly robot arm (SCARA).

The robot hand 152 is supported by the robot arm 151. The robot hand 152 is attached to a predetermined portion of the robot arm 151, for example, the distal end of the robot arm 151. The robot hand 152 is configured to be capable of holding each of the workpieces 3 and 4.

The robot hand 152 includes at least two finger portions, which are two finger portions 153 and 154 in the first embodiment. In the case where the finger portion 153 is a first finger portion, the finger portion 154 is a second finger portion, and in the case where the finger portion 154 is a first finger portion, the finger portion 153 is a second finger portion.

The finger portions 153 and 154 may operate in any manner such as a rotation operation, a translational movement operation, or an operation of moving closer to or away from a holding center, as long as the workpiece can be held by the finger portions 153 and 154. To be noted, the robot hand 152 is not limited to a robot hand including the two finger portions 153 and 154, and may include three or more finger portions. A proximity sensor may be provided on a side of the finger portion 153 opposing the finger portion 154.

According to the configuration described above, the robot hand 152 can be moved to a desired position by the robot arm 151, and the robot 150 can be caused to perform a work of holding the workpiece 3 or the workpiece 4.

The robot 150 can, in a manufacture line for manufacturing a product, hold the workpiece by the robot hand 152 to perform a conveyance work or an assembly work of coupling the workpiece to another workpiece, or grip a tool to perform a processing work on the workpiece. Alternatively, the robot 150 can perform a work by attaching an actuator different from the robot hand 152 to the distal end of the robot arm 151 instead of the robot hand 152 in accordance with the details of the work in a manufacturing process.

For example, a plurality of workpieces are disposed around the robot 150, for example, on the base 5. A product that is an assembled product can be manufactured by a manufacturing method of causing the robot 150 to hold one workpiece and causing the robot 150 to couple the workpiece to another workpiece. The assembled product may be an intermediate product or a final product.

The vision sensor 8 has a function of sensing things on the base 5. The vision sensor 8 outputs sensing data to the information processing apparatus 100 as a sensing result. The sensing data of the vision sensor 8 is preferably digital data obtained as data of the state on the base 5, such as a gradation image or a point cloud. Particularly, the sensing data is preferably data in a tensor format suitable as input data for machine learning, such as a gradation image. The gradation image is, for example, a monochromatic image or a color image. The color image is, for example, an RGB image.

In the first embodiment, the vision sensor 8 is a digital camera including an unillustrated image sensor. The image sensor is, for example, a complementary metal oxide semi-conductor (CMOS) image sensor or a charge coupled device (CCD) image sensor. The vision sensor 8 generates, as the sensing data, an image, for example, a monochromatic image or a color image in which an object is captured, by imaging the object, and outputs the captured image to the information processing apparatus 100.

The vision sensor 8 is disposed at a position where the vision sensor 8 can image the workpieces 3 and 4 disposed on the base 5. For example, the vision sensor 8 is disposed above the base 5. The vision sensor 8 is fixed to an unillustrated frame disposed around the robot 150.

To be noted, the installation position of the vision sensor 8 is not limited to the frame, and the vision sensor 8 may be disposed at the robot 150 or the bottom portion of the base 5. In addition, the vision sensor 8 may be a single-lens camera, or a stereo camera.

In the first embodiment, the information processing apparatus 100 is constituted by a computer. The information processing apparatus 100 can cause the vision sensor 8 to capture an image by transmitting an imaging command to the vision sensor 8. The information processing apparatus 100 is configured to be capable of obtaining image information (image data) generated by the vision sensor 8, and is configured to be capable of processing the obtained image information. In addition, the information processing apparatus 100 is capable of performing control processing for controlling the robot 150 in addition to information processing.

Figure 2A:
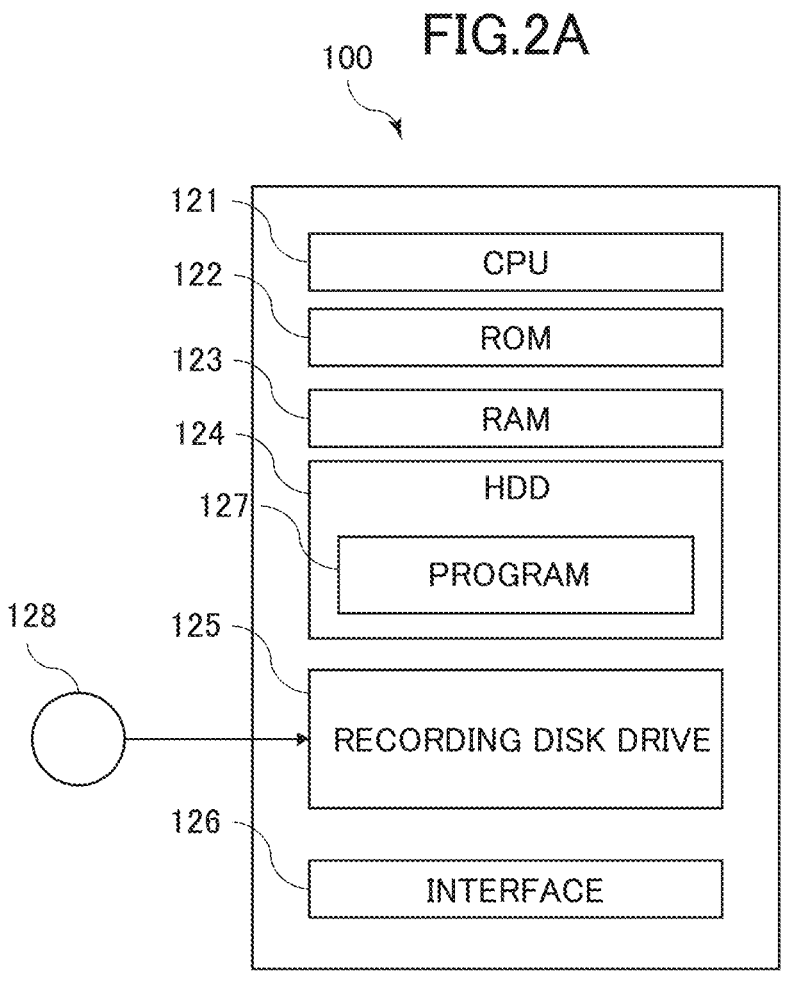
FIG. 2A is a block diagram illustrating a configuration of an information processing apparatus according to the first embodiment.

FIG. 2A is a block diagram illustrating a configuration of the information processing apparatus 100 according to the first embodiment. The information processing apparatus 100 is constituted by a computer, and includes a central processing unit (CPU) 121 serving as an example of a processor. In addition, the information processing apparatus 100 includes, as storage portions, a read-only memory (ROM) 122, a random access memory: (RAM) 123, and a hard disk drive (HDD) 124. In addition, the information processing apparatus 100 includes a recording disk drive 125, and an interface 126 that is an input/output interface.

The CPU 121, the ROM 122, the RAM 123, the HDD 124, the recording disk drive 125, and the interface 126 are interconnected via a bus such that data can be communicated therebetween. The ROM 122 stores a basic program related to the operation of the computer. The RAM 123 is a storage device that temporarily stores various data such as results of arithmetic processing by the CPU 121. The HDD 124 stores results of arithmetic processing by the CPU 121, various data obtained from the outside, and the like, and also stores a program 127 for causing the CPU 121 to perform information processing of an information processing portion 200 and control processing of a controller 300. The program 127 is application software for causing the CPU 121 to function as the information processing portion 200 and the controller

300. Therefore, the CPU 121 is capable of functioning as the information processing portion 200 and the controller 300 and performing the information processing and the control processing by executing the program 127.

The recording disk drive 125 is capable of loading various data, programs and the like stored in a recording disk 128. To be noted, although the HDD 124 serves as a non-transitory computer-readable recording medium and the program 127 is stored in the HDD 124 in the first embodiment, the configuration is not limited to this. The program 127 may be stored in any recording medium as long as the program 127 is stored in a non-transitory computer-readable recording medium. As the recording medium for supplying the program 127 to the computer, for example, flexible disks, hard disks, optical disks, magneto-photo disks, magnetic tapes, nonvolatile memories, and the like can be used.

In addition, the information processing apparatus 100 may be configured to be capable of communicating with an external device through a network, and the program 127 may be downloaded from the external device through the network.

In addition, although the information processing apparatus 100 is configured to perform the processing of the information processing portion 200 and the controller 300, the configuration is not limited to this. For example, an apparatus different from the information processing apparatus 100 or a CPU different from the CPU 121 may be caused to perform the control processing of the controller 300.

The information processing portion 200 calculates the holding position of the robot 150 for the robot 150 to hold the workpiece 3 or 4, on the basis of input data obtained from the vision sensor 8 and a learned model 250.

The controller 300 operates the robot arm 151 and the robot hand 152 on the basis of the information of the holding position obtained from the information processing portion 200, and thus performs a workpiece holding operation and a workpiece conveyance operation. The holding position includes information of a position in a three-dimensional space defined in a robot coordinate system. The robot coordinate system is a three-dimensional orthogonal coordinate system based on the robot 150, and for example, the root end of the robot 150 is set as the origin thereof.

The information processing portion 200 generates the learned model 250 illustrated in FIG. 1 in a learning phase, and obtains the holding position by using the learned model 250 in an inference phase. Processing performed by the information processing portion 200 in the inference phase will be described in detail below.

Figure 2B:
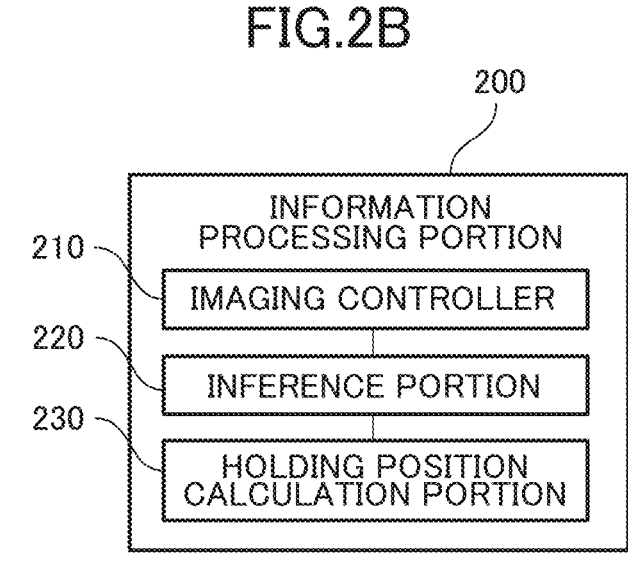
FIG. 2B is an explanatory diagram of an information processing portion according to the first embodiment.
Figure 3:
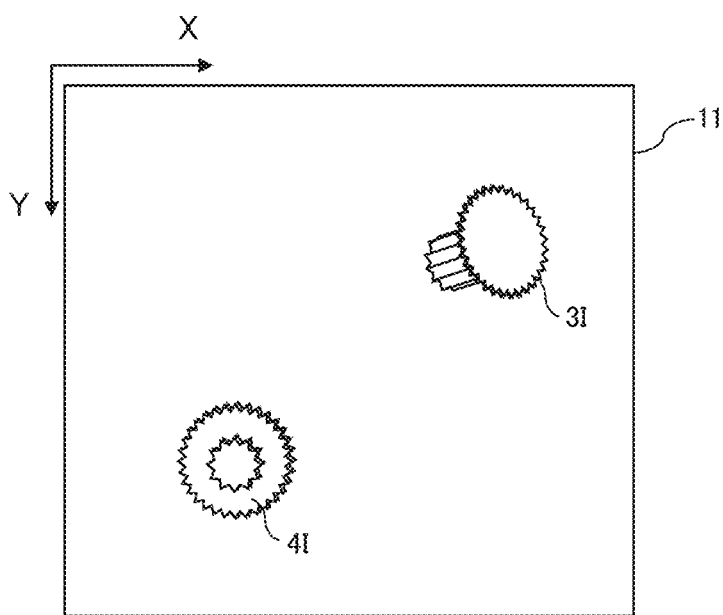
FIG. 3 is an explanatory diagram of an image according to the first embodiment.

FIG. 2B is an explanatory diagram of the information processing portion 200 according to the first embodiment. The information processing portion 200 includes an imaging controller 210, an inference portion 220, and a holding position calculation portion 230. FIG. 3 is an explanatory diagram of an image 11 according to the first embodiment.

The imaging controller 210 causes the vision sensor 8 to image the base 5 to sense the workpieces 3 and 4, and thus obtains the image 11 that is a captured image from the vision sensor 8. The image 11 is an example of sensing data from the vision sensor 8, and is image data. That is, the sensing data output from the vision sensor 8 is the image 11 obtained by the vision sensor 8 imaging the workpieces 3 and 4. The imaging direction of the vision sensor 8 is, for example, the vertical direction. A vision coordinate system is defined for the vision sensor 8. The X direction and the Y direction in the vision coordinate system are directions intersecting with (orthogonal to) the imaging direction. The X direction and the Y direction intersect with (are orthogonal to) each other.

The image 11 is a digital image including a plurality of pixels arranged in the matrix direction, that is, in the X direction and the Y direction.

The workpieces 3 and 4 disposed on the base 5 as viewed from the vision sensor 8 are captured in the image 11. That is, the image 11 includes a workpiece image 3I constituted by two or more pixels corresponding to the workpiece 3 and a workpiece image 4I constituted by two or more pixels corresponding to the workpiece 4. The image 11 is an image in which a scene viewed from the vision sensor 8 is projected onto an X-Y plane that is a predetermined plane. The X-Y plane is a virtual plane.

Figure 4:
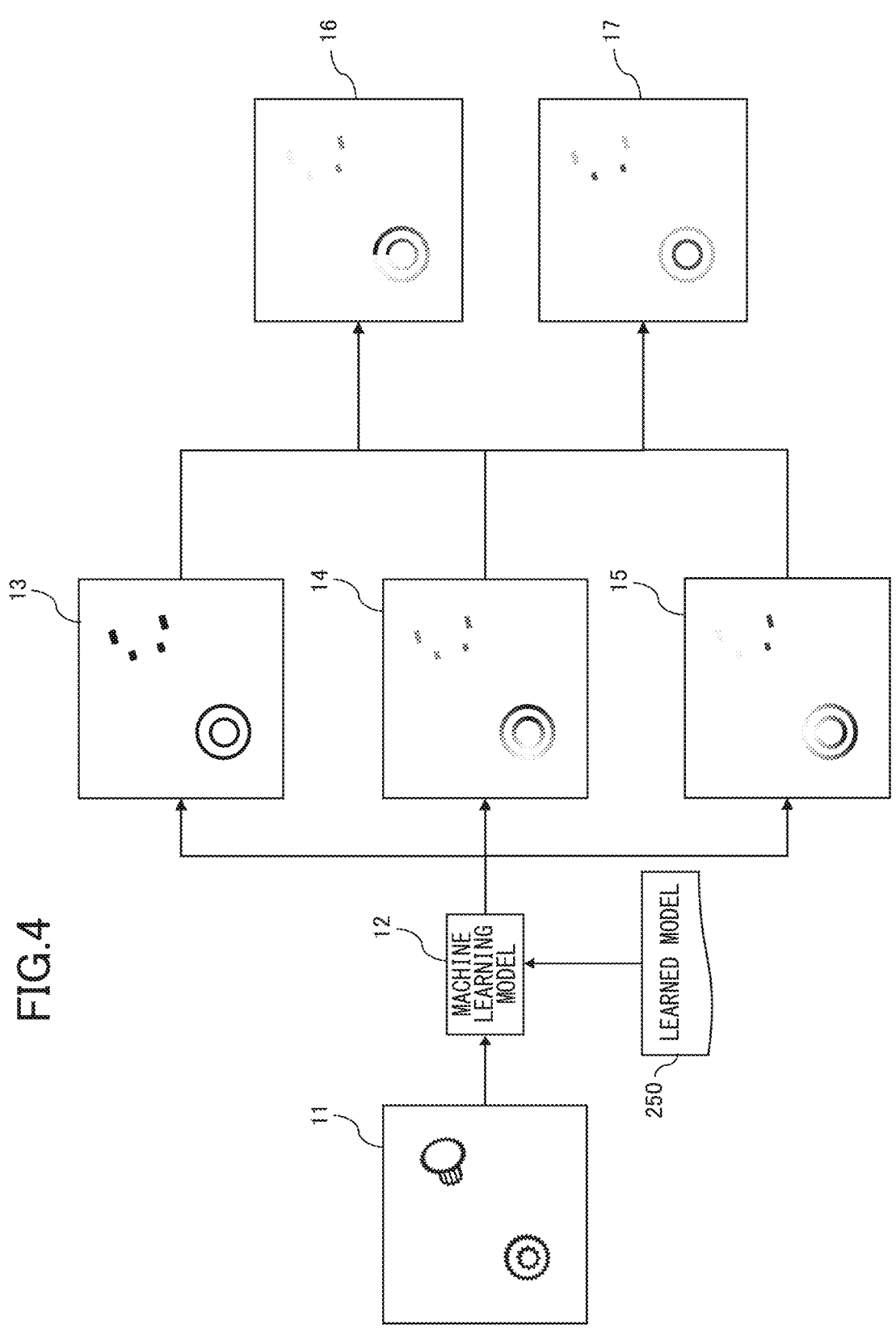
FIG. 4 is an explanatory diagram of inference processing of an inference portion according to the first embodiment.

FIG. 4 is an explanatory diagram of inference processing of an inference portion 220 according to the first embodiment. The inference portion 220 applies the learned model 250 to a machine learning model 12, and performs inference by using the image 11 as input data.

A model applying semantic segmentation is used for the machine learning model 12. Semantic segmentation is a machine learning algorithm having a function of outputting an image in response to an input of an image, and has a characteristic that an output image in which label data is imparted to each pixel of the input data can be output.

Examples of the machine learning model for performing semantic segmentation include U-Net and HRNet, but any machine learning model may be used as long as label data can be imparted to each pixel of the image 11.

In the first embodiment, a U-Net model having three output layers is used as the machine learning model 12. To be noted, in the inference phase, the learned model 250 generated in advance in the learning phase is used as the machine learning model 12.

The inference portion 220 performs inference by using image 11 as the input data for the learned model 250, and obtains three images 13, 14, and 15 as output data serving as a result of the inference. The three images 13 to 15 each correspond to the image 11, and are defined in the same vision coordinate system as the image 11. Therefore, the images 13, 14, and 15 are defined in the same X-Y plane as the image 11. That is, the images 13, 14, and 15 obtained by the inference by the learned model 250 are information defined in the same X-Y plane as the image 11. The three images 13 to 15 each include a plurality of pixels that are of the same arrangement and the same pixel number as the image 11.

The inference portion 220 generates two images 16 and 17 on the basis of the three images 13, 14, and 15, and outputs the two images 16 and 17 to the holding position calculation portion 230. The two images 16 and 17 each correspond to the image 11, and are defined in the same coordinate system as the image 11. Therefore, the images 16 and 17 are defined in the same X-Y plane as the image 11. The two images 16 and 17 each include a plurality of pixels that are of the same arrangement and the same pixel number as the image 11.

Figure 5:
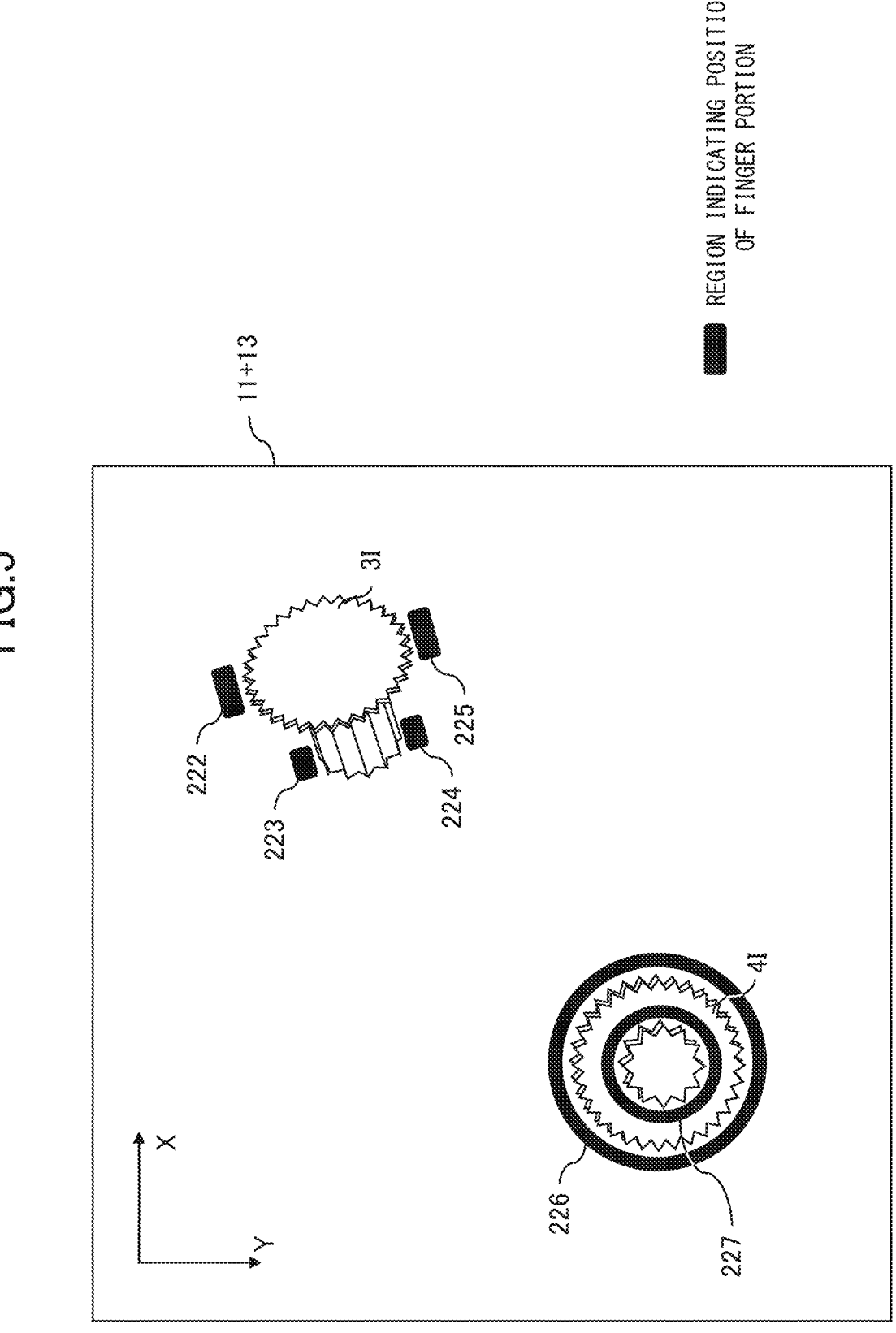
FIG. 5 is an explanatory diagram of an image according to the first embodiment.

FIG. 5 is an explanatory diagram of the image 13 according to the first embodiment. To be noted, FIG. 5 illustrates an image (11+13) in which the image 11 and the image 13 are superimposed on each other. Specifically, the image 13 is superimposed on the image 11. The inference portion 220 displays an image based on the image (11+13) illustrated in FIG. 5 on the display apparatus 400. To be noted, the inference portion 220 may display the image 11, the image 13, or an image based on the image (11+13) on the display apparatus 400.

The image 13 is an image in which a region that can be the position of the finger portion 153 or 154 in the case of causing the robot 150 to perform the holding operation of holding the workpiece 3 or 4 and regions different from that region are indicated by different colors (labels).

In the image (11+13), regions 222, 223, 224, and 225 corresponding to the workpiece 3 are positioned around the workpiece image 3I, and regions 226 and 227 corresponding to the workpiece 4 are positioned around the workpiece image 4I. The regions 222 to 225 are regions including a plurality of positions that can be the position of the finger portion 153 or 154 in the case of causing the finger portions 153 and 154 included in the robot 150 to start execution of the holding operation of holding the workpiece 3. The regions 226 and 227 are regions including a plurality of positions that can be the position of the finger portion 153 or 154 in the case of causing the finger portions 153 and 154 included in the robot 150 to start execution of the holding operation of holding the workpiece 4.

In FIG. 5, the regions 222 to 227 illustrated in a solid black color are two-dimensional regions in the image 13, and correspond to regions viewed from the vision sensor 8 in a three-dimensional space of the real space in which the robot 150 is installed. The regions 222 to 227 are regions that the finger portion 153 or 154 of the robot hand 152 can enter in the three-dimensional space of the real space. The regions 222 to 225 are set at positions away from the workpiece 3 such that the finger portion 153 or 154 does not come into contact with the workpiece 3 when entering the regions 222 to 225. Similarly, the regions 226 and 227 are set at positions away from the workpiece 4 such that the finger portion 153 or 154 does not come into contact with the workpiece 4 when entering the regions 226 and 227.

In addition, the regions 222 to 225 are regions in which the finger portion 153 or 154 does not collide with an object around the workpiece 3 in the case where the finger portion 153 or 154 is caused to enter a position in the regions 222 to 225 in the three-dimensional space of the real space. In addition, the regions 226 and 227 are regions in which the finger portion 153 or 154 does not collide with an object around the workpiece 4 in the case where the finger portion 153 or 154 is caused to enter a position in the regions 226 and 227 in the three-dimensional space of the real space.

Each pixel of the image 13 can be expressed by binary label data of "1" indicating that the finger portion 153 or 154 can enter the pixel and "0" indicating that the finger portion 153 or 154 cannot enter the pixel. In the display apparatus 400, a region where the label data is "1" is indicated by black, and a region where the label data is "0" is indicated by white. The regions 222 to 227 are regions assigned with the label data of "1". Each pixel in the regions 222 to 227 indicates a position of a predetermined portion of the finger portion 153 or 154. The position of each pixel in the regions 222 to 227 can be the position of the finger portion 153 or 154 when causing the robot 150 to perform the holding operation. To be noted, each pixel of the image 13 may be expressed by a label data of a plurality of shades in accordance with the amount of margin of entrance of the finger portion 153 or 154, the certainty thereof, or the like.

Figure 6:
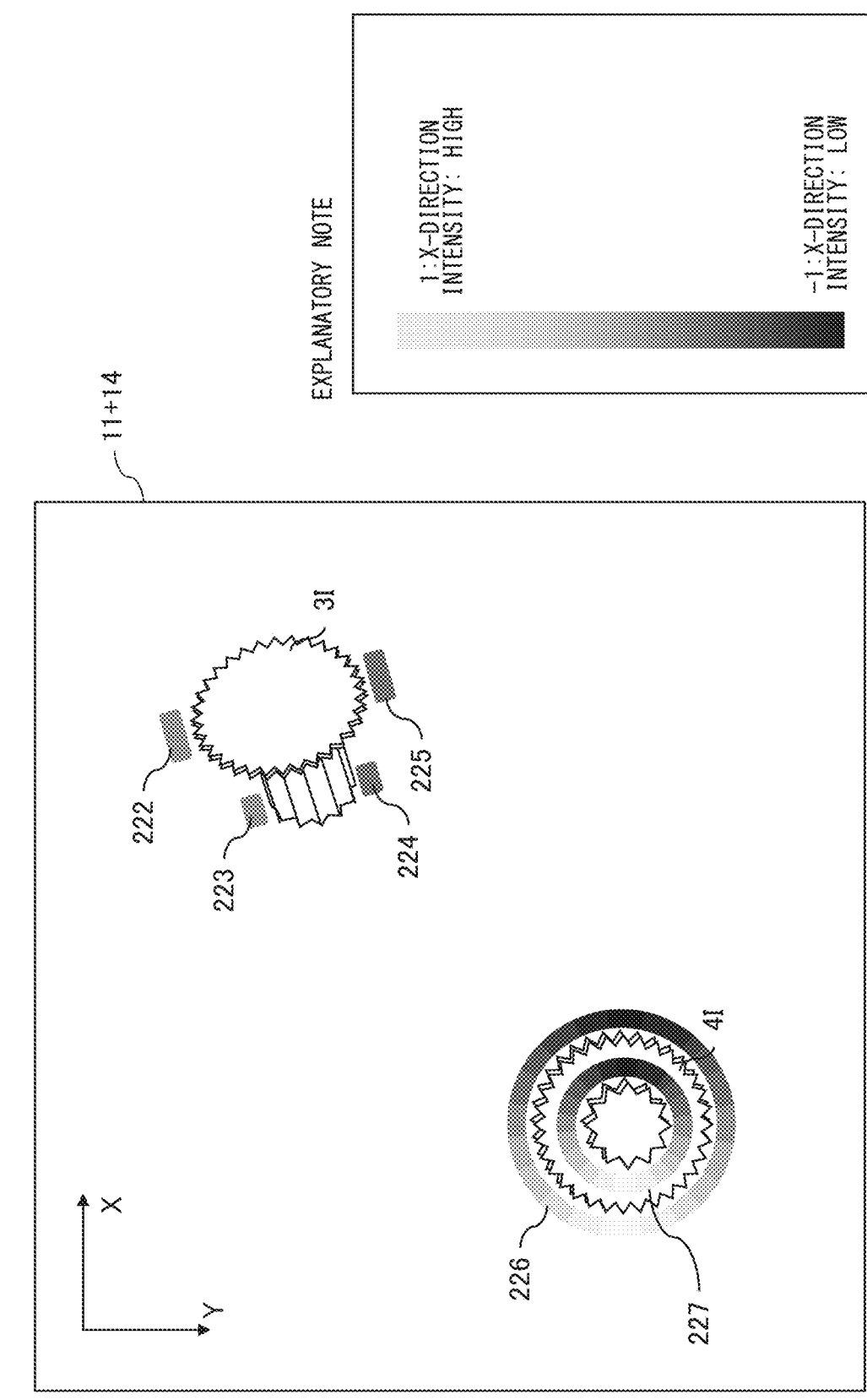
FIG. 6 is an explanatory diagram of an image according to the first embodiment.

FIG. 6 is an explanatory diagram of the image 14 according to the first embodiment. To be noted, FIG. 6 illustrates an image (11+14) in which the image 11 and the image 14 are superimposed on each other. Specifically, the image 14 is superimposed on the image 11. The inference portion 220 displays an image based on the image (11+14) illustrated in FIG. 6 on the display apparatus 400. To be noted, the inference portion 220 may display the image 11, the image 14, or an image based on the image (11+14) on the display apparatus 400.

In the image (11+14), the regions 222, 223, 224, and 225 corresponding to the workpiece 3 are positioned around the workpiece image 3I, and the regions 226 and 227 corresponding to the workpiece 4 are positioned around the workpiece image 4I.

The image 14 is an image in which a distance in the X direction from the finger portion 153 (154) to the finger portion 154 (153) at each position (pixel) in the regions 222 to 227 is expressed by label data indicating gradation such as the shade. In the first embodiment, each position (pixel) in the regions 222 to 227 is imparted with label data indicating gradation, and the label data is expressed by shades of black in the example of FIG. 6.

In the example of FIG. 6, when the color of each of the regions 222 to 227 is whiter, that is, when the label data (shade value) of the pixel in each of the regions 222 to 227 is closer to "1", it is indicated that the intensity of a component in the X direction is larger in the movement direction (vector) of the finger portion 153 or 154. Here, the "intensity" is information indicating the distance from a first finger portion (for example, the finger portion 153) to a second finger portion (for example, the finger portion 154) at the position of one pixel when focusing on the one pixel in the regions 222 to 227.

As described above, the image 14 is information of a component in the X direction indicating the distance in the X direction from the finger portion 153 (154) to the finger portion 154 (153) at each position in the regions 222 to 227. The X direction is an example of a first direction. The component in the X direction is an example of a first component. To be noted, as described above, in the case where the finger portion 153 is a first finger portion, the finger portion 154 is a second finger portion, and in the case where the finger portion 154 is a first finger portion, the finger portion 153 is a second finger portion.

The intensity is normalized in accordance with, for example, the distance between the two finger portions 153 and 154 needed for gripping a workpiece. In the example of FIG. 6, the intensity is normalized into a value in a range from "1" to "−1" with the X direction being a positive direction. For example, in the case where the intensity is "0", the distance in the X direction from the first finger portion to the second finger portion is 0. In this case, the first finger portion and the second finger portion in an open state oppose each other in the Y direction. In the case where the intensity is positive, the second finger portion is positioned in a positive direction along the X axis with respect to the first finger portion, and in the case where the intensity is negative, the second finger portion is positioned in a negative direction along the X axis with respect to the first finger portion.

In the example of FIG. 6, the distance from the first finger portion to the second finger portion is about 30% of the opening width in the positive direction along the X axis at the position of each pixel in the region 222, and therefore label data (shade value) of "0.3" is applied to each pixel of the region 222.

Figure 7:
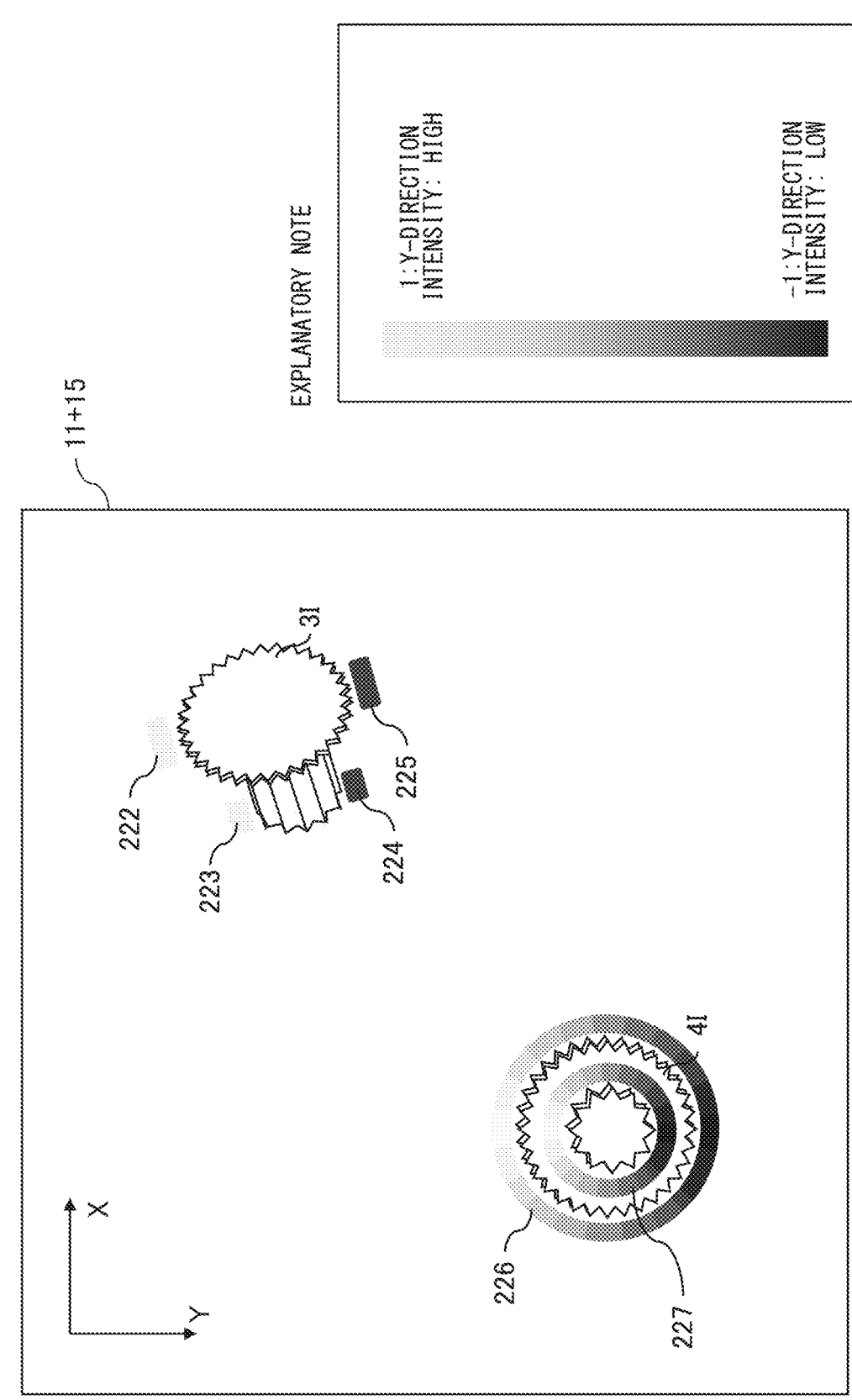
FIG. 7 is an explanatory diagram of an image according to the first embodiment.

FIG. 7 is an explanatory diagram of the image 15 according to the first embodiment. To be noted, FIG. 7 illustrates an image (11+15) in which the image 11 and the image 15 are superimposed on each other. Specifically, the image 15 is superimposed on the image 11. The inference portion 220 displays an image based on the image (11+15) illustrated in FIG. 7 on the display apparatus 400. To be noted, the inference portion 220 may display the image 11, the image 15, or an image based on the image (11+15) on the display apparatus 400.

In the image (11+15), the regions 222, 223, 224, and 225 corresponding to the workpiece 3 are positioned around the workpiece image 3I, and the regions 226 and 227 corresponding to the workpiece 4 are positioned around the workpiece image 4I.

Label data related to the distance in the X direction is applied to the image 14, and label data related to the distance in the Y direction is applied to the image 15.

The image 15 is an image in which a distance in the Y direction from the finger portion 153 (154) to the finger portion 154 (153) at each position (pixel) in the regions 222 to 227 is expressed by label data indicating gradation such as the shade. In the first embodiment, each position (pixel) in the regions 222 to 227 is imparted with label data indicating gradation, and the label data is expressed by shades of black in the example of FIG. 7.

In the example of FIG. 7, when the color of each of the regions 222 to 227 is whiter, that is, when the label data (shade value) of the pixel in each of the regions 222 to 227 is closer to "1", it is indicated that the intensity of a component in the Y direction is larger in the movement direction (vector) of the finger portion 153 or 154.

As described above, the image 14 is information of a component in the Y direction indicating the distance in the Y direction from the finger portion 153 (154) to the finger portion 154 (153) at each position in the regions 222 to 227. The Y direction is an example of a second direction. The component in the Y direction is an example of a second component. To be noted, as described above, in the case where the finger portion 153 is a first finger portion, the finger portion 154 is a second finger portion, and in the case where the finger portion 154 is a first finger portion, the finger portion 153 is a second finger portion.

Figure 8:
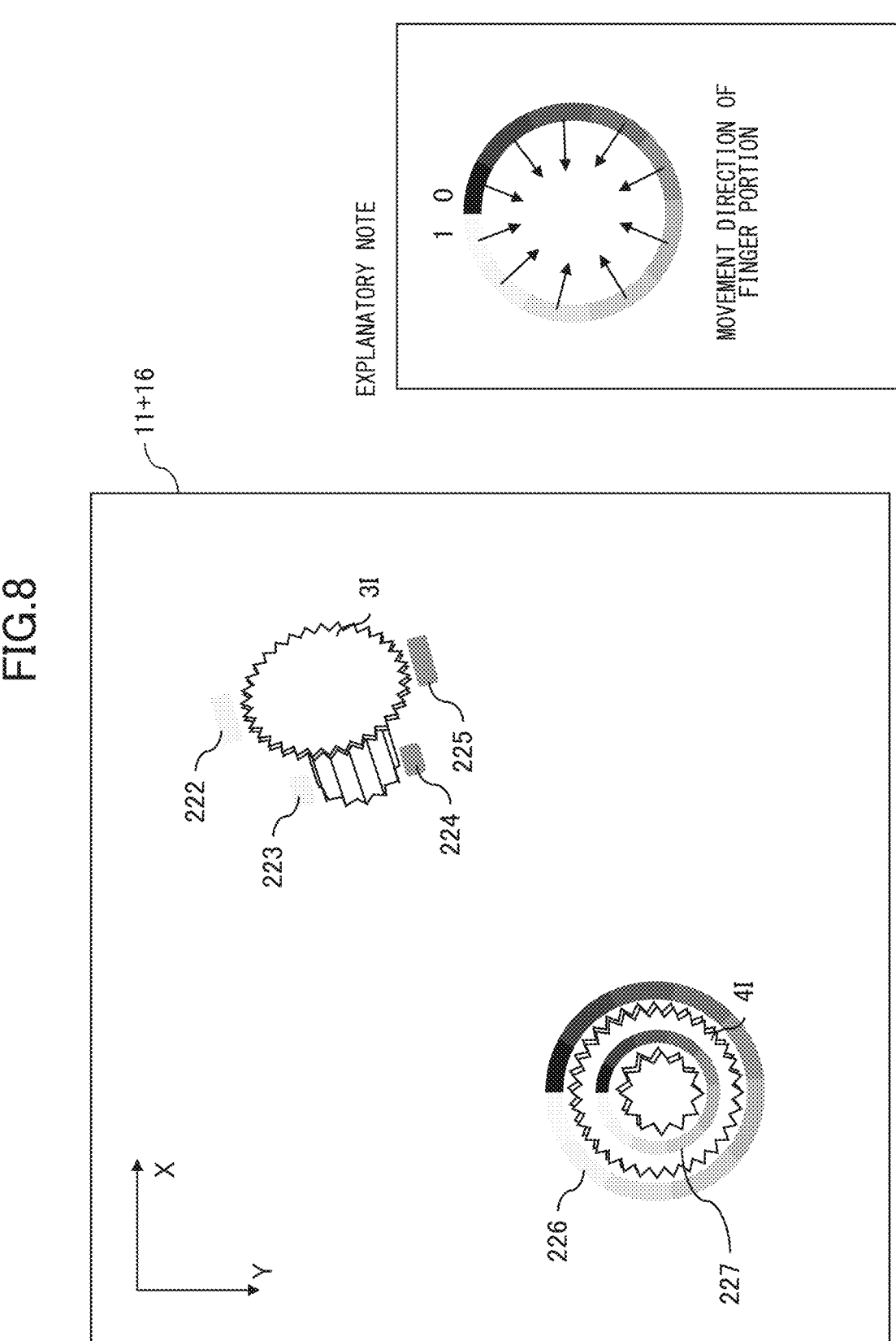
FIG. 8 is an explanatory diagram of an image according to the first embodiment.

FIG. 8 is an explanatory diagram of the image 16 according to the first embodiment. The image 16 is an image indicating the movement direction of the finger portion 153 or 154. To be noted, FIG. 8 illustrates an image (11+16) in which the image 11 and the image 16 are superimposed on each other. Specifically, the image 16 is superimposed on the image 11. The inference portion 220 displays an image based on the image (11+16) illustrated in FIG. 8 on the display apparatus 400. To be noted, the inference portion 220 may display the image 11, the image 16, or an image based on the image (11+16) on the display apparatus 400.

The inference portion 220 obtains the image 16 by using the images 13, 14, and 15. The image 16 is an image in which the movement direction of the finger portion 153 or 154 in the case of moving the finger portion 153 or 154 from the position of each pixel of the regions 222 to 227 as a starting point of the holding operation is expressed by the label data indicating gradation such as the shade. As described above, the inference portion 220 varies the image displayed on the display apparatus 400 in accordance with the movement direction of the finger portion 153 or 154.

The movement direction of the finger portion is a direction in which the finger portion is moved to hold a workpiece after causing the finger portion to enter a position in a region illustrated in the image 13 when causing the robot hand 152 to hold the workpiece.

The movement direction is calculated by defining a vector whose X coordinate is the label data indicating the distance and imparted to the pixel in the regions 222 to 227 in the image 14 and whose Y coordinate is the label data indicating the distance and imparted to the pixel in the regions 222 to 227 in the image 15. For example, in the region 226, in the case where the finger portion 153 is caused to enter a region on the left side of the workpiece 4, the movement direction of the finger portion 153 is a rightward direction, and in the case where the finger portion 153 is caused to enter a region on the right side of the workpiece 4, the movement direction of the finger portion 153 is a leftward direction.

As described above, the image 16 includes information of the movement direction of the finger portion 153 or 154 from each position in the regions 222 to 227 serving as a starting point of the holding operation. To be noted, although a case where the inference portion 220 generates the image 16 from the images 13 to 15 has been described in the first embodiment, the configuration is not limited to this. For example, the inference portion 220 may directly generate the image 16 by inference by the learned model 250. As described above, the inference portion 220 of the first embodiment obtains the image 16 on the basis of the inference by the learned model 250.

Figure 9:
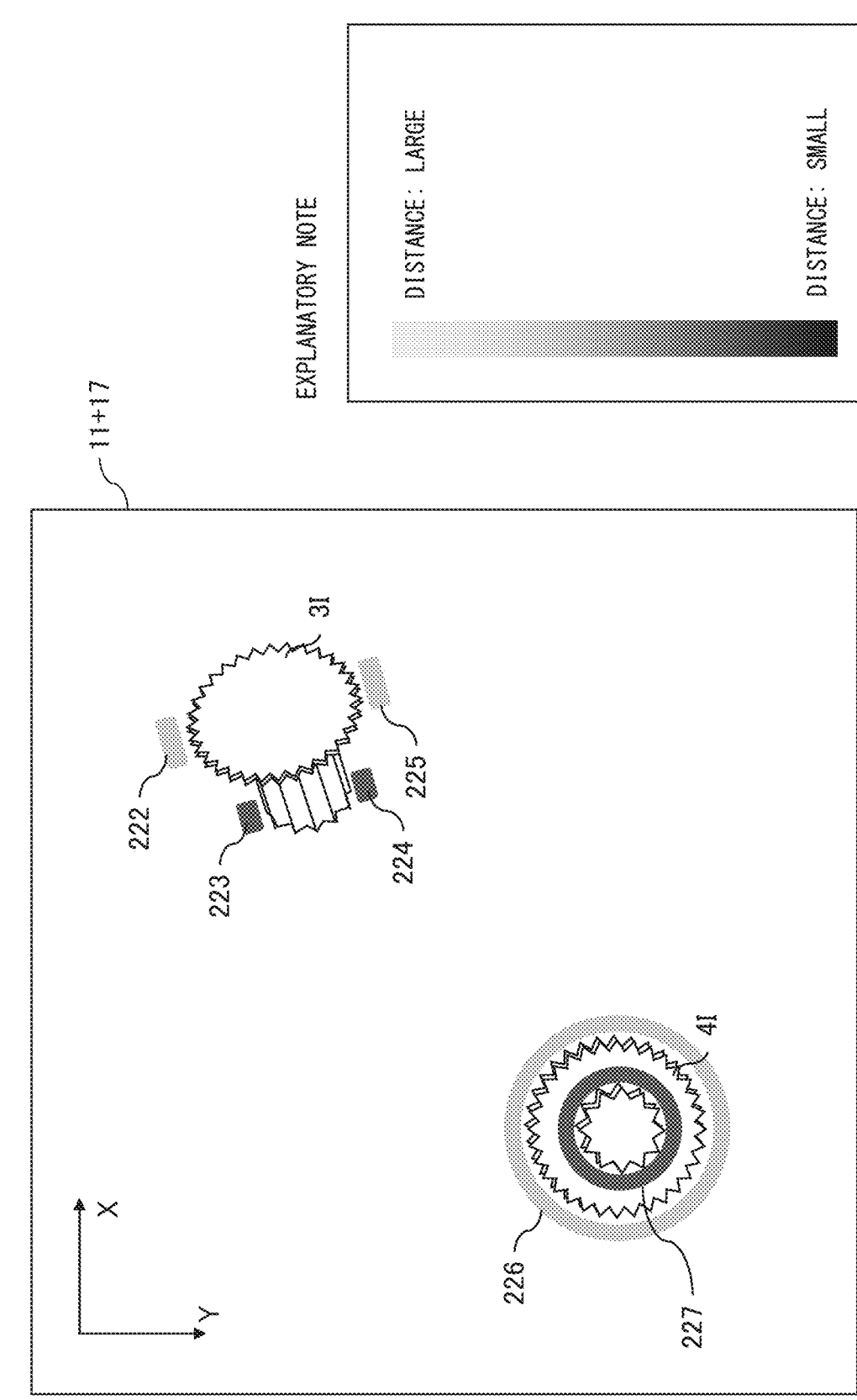
FIG. 9 is an explanatory diagram of an image according to the first embodiment.

FIG. 9 is an explanatory diagram of the image 17 according to the first embodiment. To be noted, FIG. 9 illustrates an image (11+17) in which the image 11 and the image 17 are superimposed on each other. Specifically, the image 17 is superimposed on the image 11. The inference portion 220 displays an image based on the image (11+17) illustrated in FIG. 9 on the display apparatus 400. To be noted, the inference portion 220 may display the image 11, the image 17, or an image based on the image (11+17) on the display apparatus 400.

The inference portion 220 obtains the image 17 by using the images 13, 14, and 15. The image 17 is an image in which, for the position of each pixel in the regions 222 to 227, the distance from the finger portion 153 (154) to the finger portion 154 (153) in the case where the position of the pixel serves as a starting point for movement of the finger portion 153 (154) is expressed by label data indicating gradation such as the shade.

The distance from the first finger portion to the second finger portion is the distance from the first finger portion to the second finger portion in the case where the first finger portion is caused to enter a position in a region illustrated in the image 13.

The movement direction is calculated by defining a vector whose X coordinate is the label data indicating the distance and imparted to the pixel in the regions 222 to 227 in the image 14 and whose Y coordinate is the label data indicating the distance and imparted to the pixel in the regions 222 to 227 in the image 15. The distance is expressed by the label data indicating gradation such as a shade corresponding to the value of the calculated vector or the like. In the example of FIG. 9, in the case where the color of the pixel in the regions 222 to 227 is whiter, it is indicated that the distance is larger. As described above, the inference portion 220 changes the image to be displayed on the display apparatus 400 in accordance with the distance from one to the other of the two finger portions 153 and 154.

To be noted, although a case where the inference portion 220 performs the inference processing by regarding the entirety of the image 11 as one area has been described, the configuration is not limited to this, and for example, the inference portion 220 may divide the image 11 serving as an input image into a plurality of areas and perform the inference processing for each area.

As described above, the image 17 includes information of the distance from the finger portion 153 (154) to the finger portion 154 (153) at each position in the regions 222 to 227. To be noted, although a case where the inference portion 220 generates the image 17 from the images 13 to 15 has been described in the first embodiment, the configuration is not limited to this. For example, the inference portion 220 may directly generate the image 17 by inference by the learned model 250. As described above, the inference portion 220 of the first embodiment obtains the image 17 on the basis of the inference by the learned model 250.

Here, the learning processing of the inference portion 220 in the learning phase will be described. The inference portion 220 generates the learned model 250 by causing the machine learning model 12 to perform supervised learning. To generate the learned model 250, a lot of pairs of the image 11 and correct answer data (images 13, 14, and 15) are prepared. In the description below, two examples of a method of generating the images 11, 13, 14, and 15 used for the machine learning will be shown below.

1. A worker generates teacher data.

2. Teacher data is generated by computer simulation.

The first method is a method in which a worker generates the images 11, 13, 14, and 15. The worker randomly disposes a workpiece 2 on the base 5 illustrated in FIG. 1, inputs a command to the information processing apparatus 100, and thus causes the information processing apparatus 100 to cause the vision sensor 8 to image the workpiece 2. As a result of this, the information processing apparatus 100 obtains the image 11. The worker opens a file of the image 11 by a paint tool or the like, imparts the label data to corresponding pixels by painting the pixels with a color or the like, and thus generates the images 13 to 15. At this time, the worker may generate the images 13 to 15 while, for example, making determination on, for example, whether or not to paint a portion interfering with another workpiece, a portion where taking out the workpiece is difficult, or the like with a color.

The second method is a method in which the information processing apparatus 100 generates the images 11, 13, 14, and 15 by computer simulation. The simulation is performed for a virtual environment reproducing the real environment. The information processing apparatus 100 performs simulation in which a virtual model corresponding to the workpiece 2 is randomly disposed on a virtual model corresponding to the base 5, and thus generates the image 11 viewed from a position corresponding to the position of the vision sensor 8. In the information processing apparatus 100, information of positions where the finger portions 153 and 154 can grip the workpiece is set in advance. As a result of this, the information processing apparatus 100 can calculate positions where the finger portions do not collide with an object around the workpiece serving as a holding target. Therefore, the information processing apparatus 100 can automatically generate the images 13, 14, and 15 automatically.

As described above, the information processing portion 200 generates the learned model 250 in the learning phase by supervised learning using data such as the images 11, 13, 14, and 15.

Next, the processing of the holding position calculation portion 230 will be described. The holding position calculation portion 230 uses various information calculated by the inference portion 220, that is, at least one of the images 13 to 17 to calculate information (holding position) for causing the finger portions 153 and 154 of the robot hand 152 to hold the workpiece.

The holding position includes information of the positions of the finger portions 153 and 154 in the three-dimensional space where the holding operation of causing the finger portions 153 and 154 of the robot hand 152 to hold the workpiece is started, the information of the direction of the finger portions 153 and 154, and the information of the width (holding width) between the finger portions 153 and 154.

Figure 10:
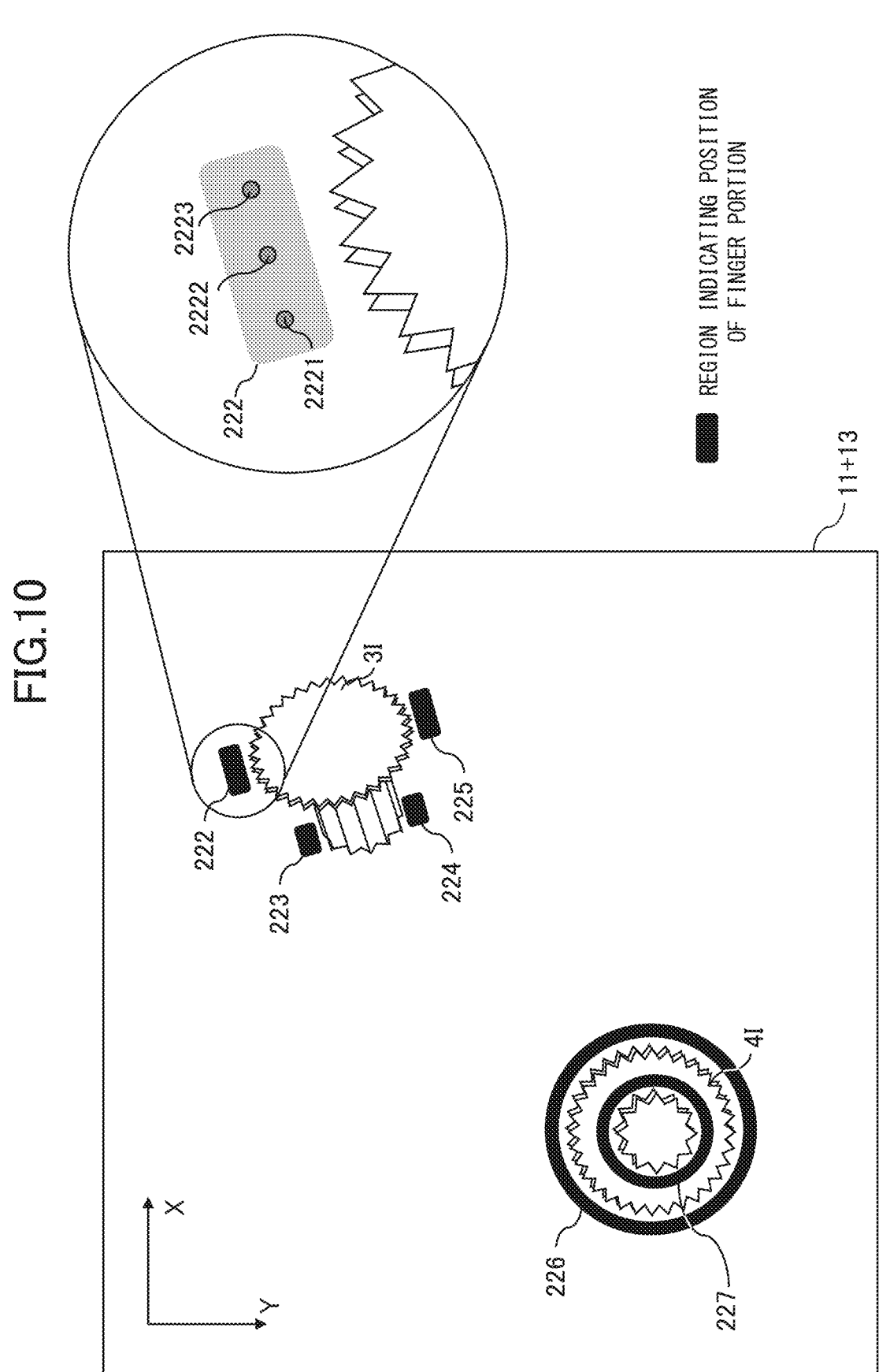
FIG. 10 is an explanatory diagram of processing of obtaining a holding position according to the first embodiment.

FIG. 10 is an explanatory diagram of a process of obtaining the holding position according to the first embodiment. FIG. 10 illustrates the image (11+13) as an example. The holding position calculation portion 230 samples position candidates of the finger portion 153 or 154 for obtaining the holding position. In the first embodiment, the holding position calculation portion 230 samples a plurality of position candidates from each of the regions 222 to 227 in the image 13. The workpiece 3 will be described below. The process performed on the workpiece 4 is substantially the same as the process performed on the workpiece 3, and therefore detailed description thereof will be omitted.

Figure 11:
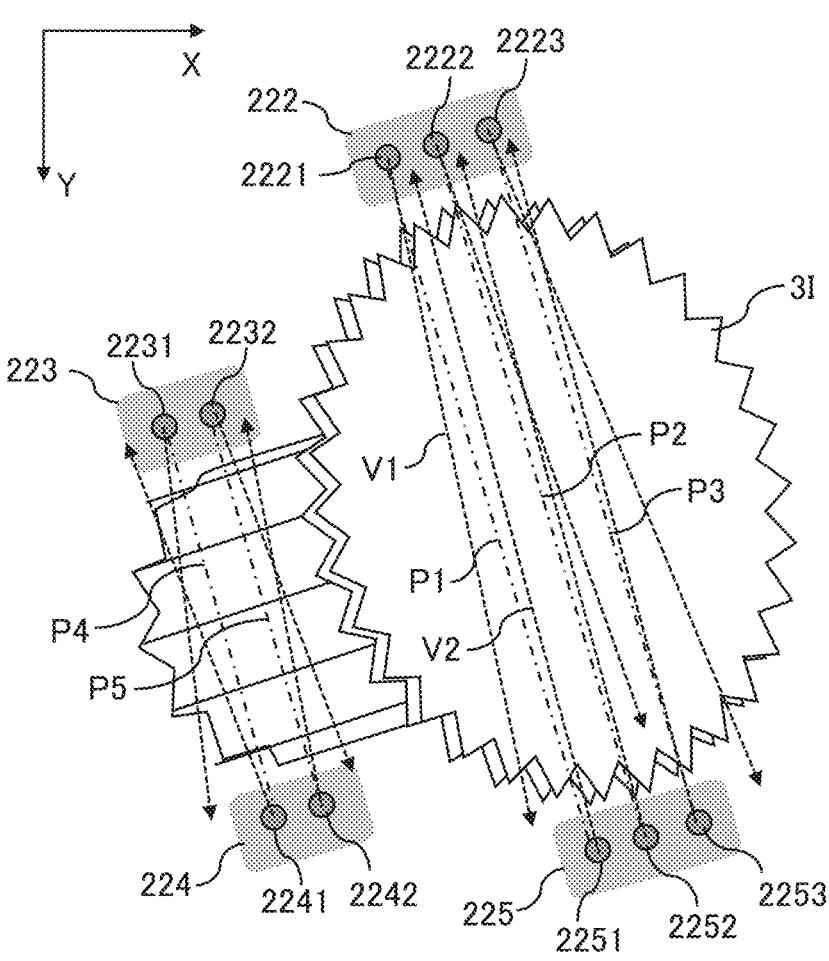
FIG. 11 is an explanatory diagram of the processing of obtaining the holding position according to the first embodiment.

FIG. 11 is an explanatory diagram of process for obtaining the holding position according to the first embodiment. A plurality of position candidates 2221, 2222, and 2223 are sampled from the region 222. A plurality of position candidates 2231 and 2232 are sampled from the region 223. A plurality of position candidates 2241 and 2242 are sampled from the region 224. A plurality of position candidates 2251, 2252, and 2253 are sampled from the region 225. The position candidates 2221, 2222, and 2223 are sampled from the region 222 such that a predetermined density is achieved. The position candidates 2231 and 2232 are sampled from the region 223 such that a predetermined density is achieved. The position candidates 2241 and 2242 are sampled from the region 224 such that a predetermined density is achieved. The position candidates 2251, 2252, and 2253 are sampled from the region 225 such that a predetermined density is achieved.

The holding position calculation portion 230 obtains a holding vector starting from each of the plurality of sampled position candidates. For example, the holding position calculation portion 230 obtains a holding vector V1 starting from the position candidate 2221, and a holding vector V2 starting from the position candidate 2251.

The holding vector V1 is a vector whose X coordinate is the label data indicating the distance and imparted to the pixel of the position candidate 2221 in the image 14 and whose Y coordinate is the label data indicating the distance and imparted to the pixel of the position candidate 2221 in the image 15. The holding vector V2 is a vector whose X coordinate is the label data indicating the distance and imparted to the pixel of the position candidate 2251 in the image 14 and whose Y coordinate is the label data indicating the distance and imparted to the pixel of the position candidate 2251 in the image 15.

As described above, the holding vector can be obtained from the image 14 and the image 15. The holding vector is a vector starting from the position candidate and indicating the direction from the first finger portion to the second finger portion and the distance from the first finger portion to the second finger portion. To be noted, the holding vector can be also obtained from the image 16 and the image 17.

Next, the holding position calculation portion 230 extracts a pair satisfying a predetermined condition as a candidate pair from the plurality of holding vectors. Specifically, the holding position calculation portion 230 extracts pairs satisfying the following two conditions as candidate pairs.

1. The angle between the two holding vectors is equal to or larger than a predetermined angle.
2. In the two holding vectors, the distance between an end point of one holding vector and a start point of the other holding vector is equal to or smaller than a certain value.

As described above, the holding position calculation portion 230 extracts two holding vectors satisfying the two conditions from the plurality of holding vectors, and extracts a pair of two position candidates corresponding to the two holding vectors as a candidate pair. In the example of FIG. 11, the position candidate 2221 corresponding to the holding vector V1 and the position candidate 2251 corresponding to the holding vector V2 are extracted as a candidate pair P1. In addition, a pair of the position candidates 2222 and 2252 is extracted as a candidate pair P2. In addition, a pair of the position candidates 2223 and 2253 is extracted as a candidate pair P3. In addition, a pair of the position candidates 2231 and 2241 is extracted as a candidate pair P4. In addition, a pair of the position candidates 2232 and 2242 is extracted as a candidate pair P5. As described above, the holding position calculation portion 230 obtains the candidate pairs P1 to P5 for the workpiece 3. In addition, the holding position calculation portion 230 also obtains candidate pairs for the workpiece 4.

As described above, the holding position calculation portion 230 executes extraction processing of extracting the candidate pairs P1 to P5 each including two position candidates corresponding to the two finger portions 153 and 154 satisfying the predetermined conditions from the plurality of positions in the regions 222 to 227 by using the images 14 and 15 or the images 16 and 17. The candidate pairs P1 to P5 are each an example of a group. The images 16 and 17 are information related to the images 14 and 15.

To be noted, in the case where the robot hand 152 includes three or more finger portions as at least two finger portions, the extracted group includes three or more position candidates as at least two position candidates corresponding to at least two finger portions. The number of the position candidates included in the group is equal to the number of the finger portions.

Figure 12:
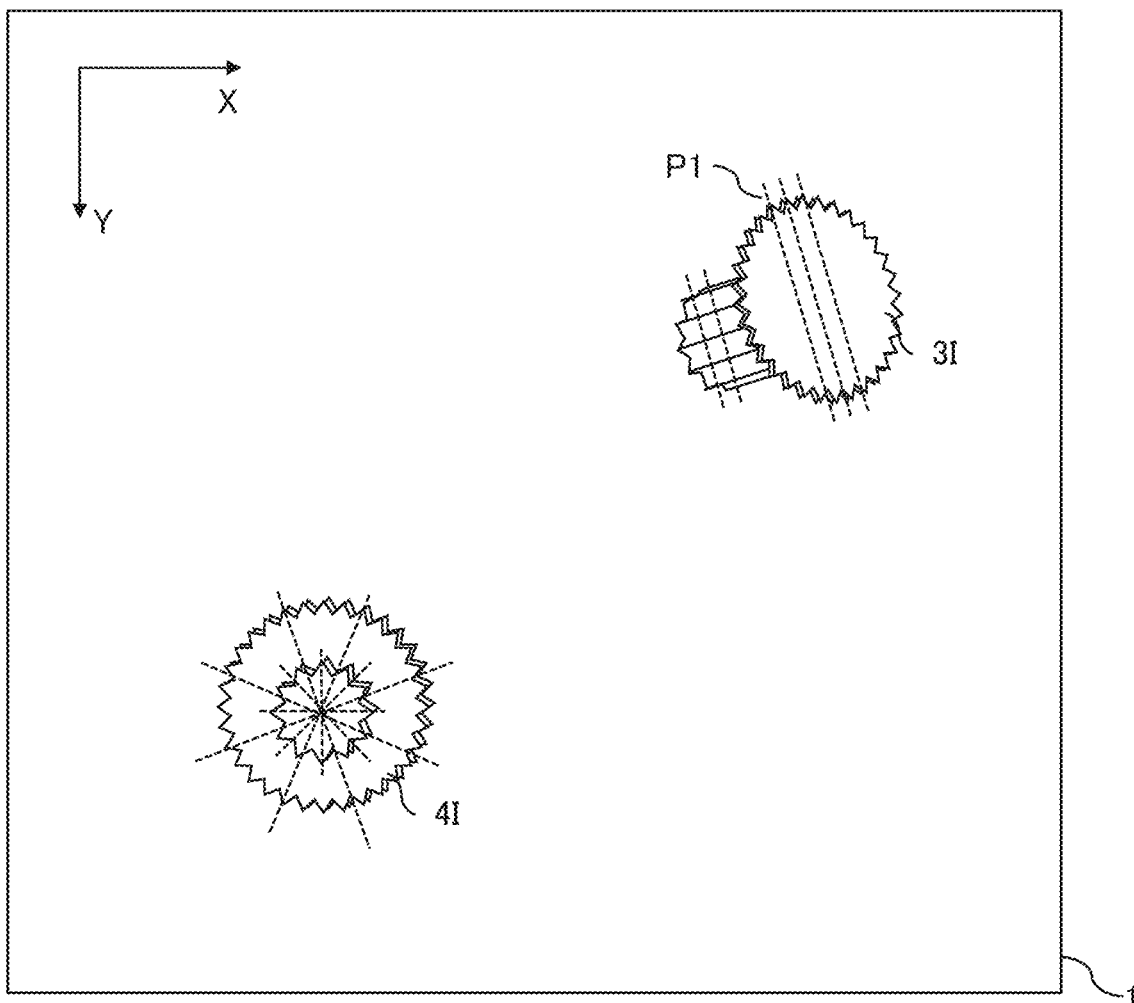
FIG. 12 is an explanatory diagram of processing of a holding position calculation portion according to the first embodiment.

FIG. 12 is an explanatory diagram of the processing of the holding position calculation portion 230 according to the first embodiment. To be noted, in FIG. 12, broken lines indicating candidate pairs are illustrated to overlap with the image 11. The holding position calculation portion 230 displays the image 11 including the broken lines indicating the candidate pairs illustrated in FIG. 12 on the display apparatus 400.

Figure 13:
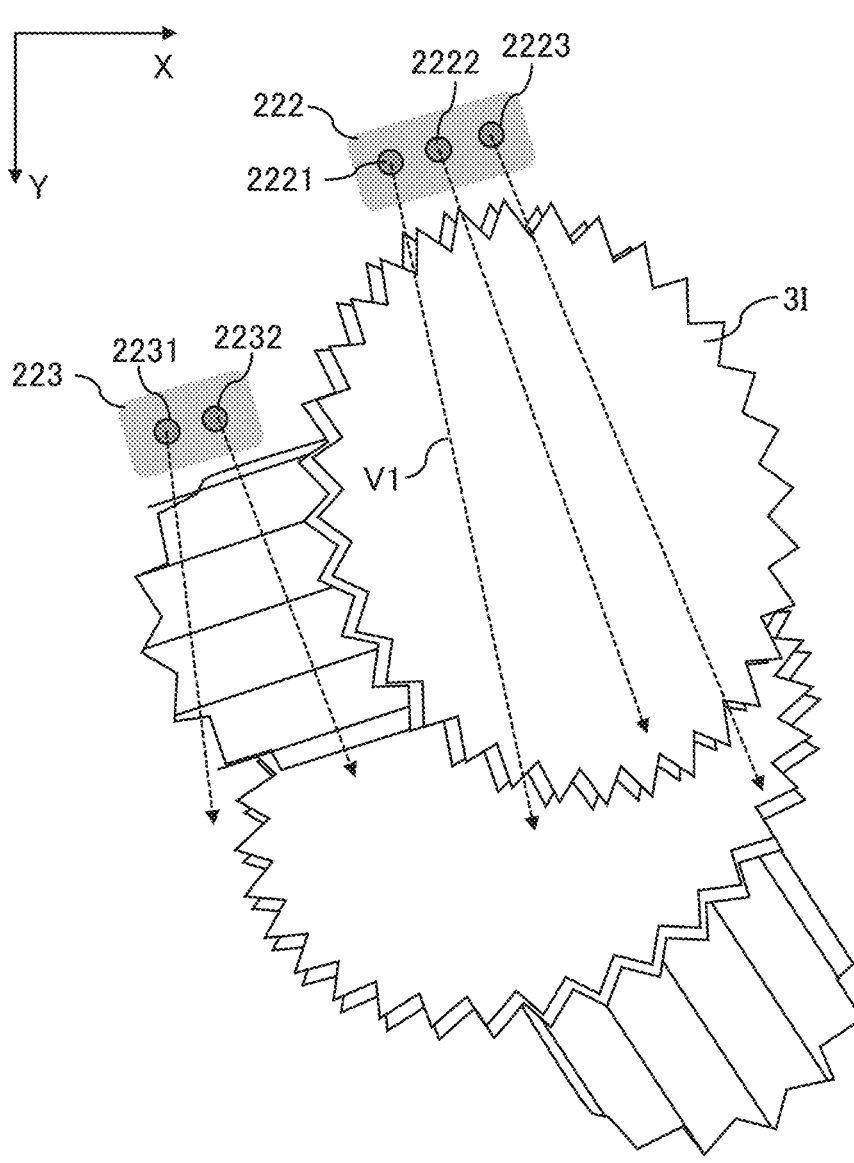
FIG. 13 is an explanatory diagram of the processing of the holding position calculation portion according to the first embodiment.

To be noted, there is a case where no candidate pair satisfying the two conditions described above can be found. FIG. 13 is an explanatory diagram of the processing of the holding position calculation portion 230 according to the first embodiment. FIG. 13 illustrates an example of a case where no candidate pair is found.

As illustrated in FIG. 13, in the case where the regions 224 and 225 illustrated in FIG. 11 are not present, extraction of candidate pairs is unsuccessful. In such a case, there is a possibility that extraction of candidate pairs becomes successful by changing the orientation of the workpiece 3. Therefore, in the case where extraction of candidate pairs by the holding position calculation portion 230 is unsuccessful in the extraction processing, the controller 300 controls the robot 150 such that the robot 150 comes into contact with the workpiece 3.

In FIG. 13, since the finger portion 153 or 154 interferes with another workpiece in a region corresponding to the region 225 of FIG. 11, the region 225 is not present, and extraction of the candidate pairs is unsuccessful. In contrast, the finger portion 153 or 154 can enter the position candidate 2221 corresponding to the holding vector V1. In the first embodiment, the information of the holding vector is used for changing the orientation of the workpiece 3. For example, the controller 300 causes the finger portion 153 of the robot hand 152 to enter the region 222, and moves the finger portion 153 in the direction of the holding vector V1. As a result of this, the position and/or orientation of the workpiece 3 can be changed, and there is a possibility that a new candidate pair can be extracted.

In the case where, for example, the extraction of the candidate pair P1 is successful in the extraction processing, the holding position calculation portion 230 determines the information of the position of each of the finger portions 153 and 154 on the basis of the extracted candidate pair P1. That is, in the case where the extraction of the candidate pair P1 is successful, the holding position calculation portion 230 sets the information of the position candidates of the finger portions 153 and 154 included in the extracted candidate pair P1 as the information (holding pair) of the positions of the finger portions 153 and 154. For example, the holding position calculation portion 230 sets the one candidate pair P1 determined from the plurality of candidate pairs P1 to P5 as a holding pair P1. Then, the holding position calculation portion 230 calculates the holding position from the determined holding pair P1. That is, the holding pair P1 is information of the position in the X and Y directions, and the holding position calculation portion 230 obtains information of the position in a direction intersecting with the X-Y plane, and thus obtains the position in the three-dimensional space corresponding to the determined holding pair P1. The information of the position in the three-dimensional space is information of a position in the robot coordinate system.

Figure 14:
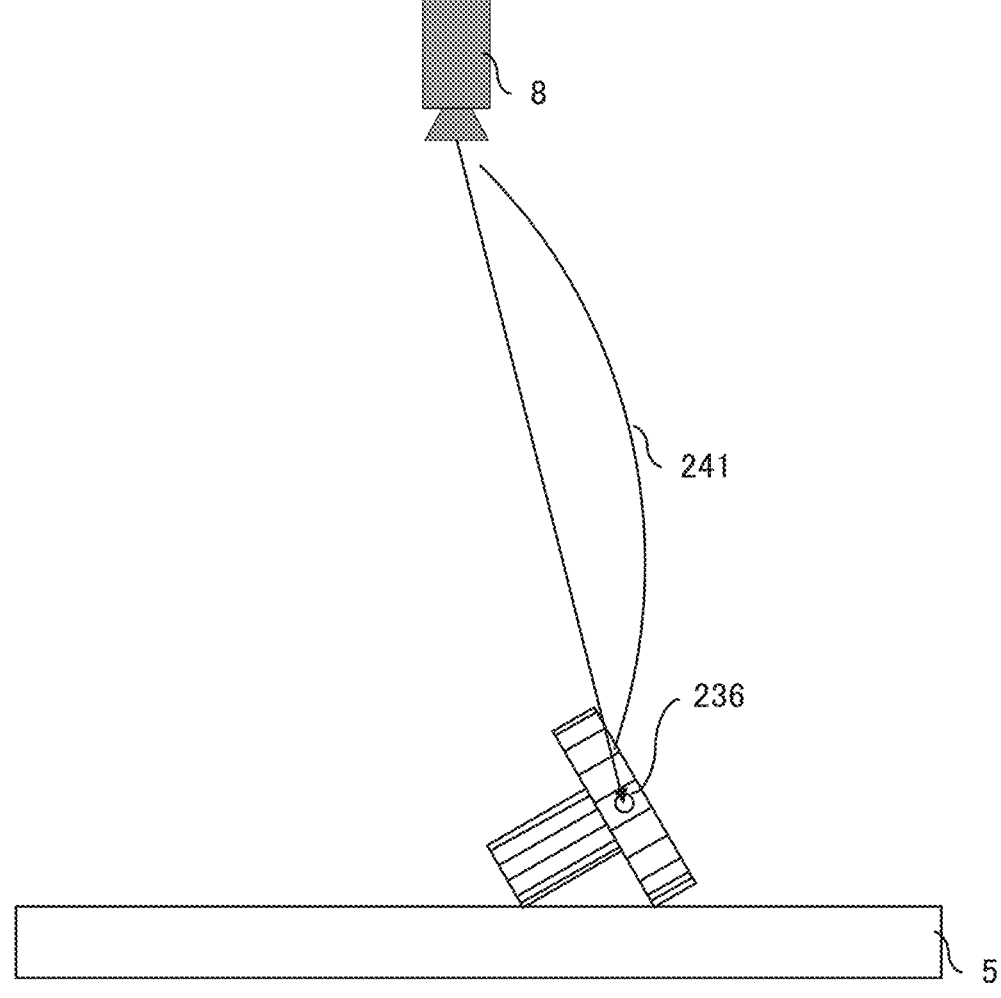
FIG. 14 is an explanatory diagram of a method for obtaining a position in a three-dimensional space according to the first embodiment.
Figure 15:
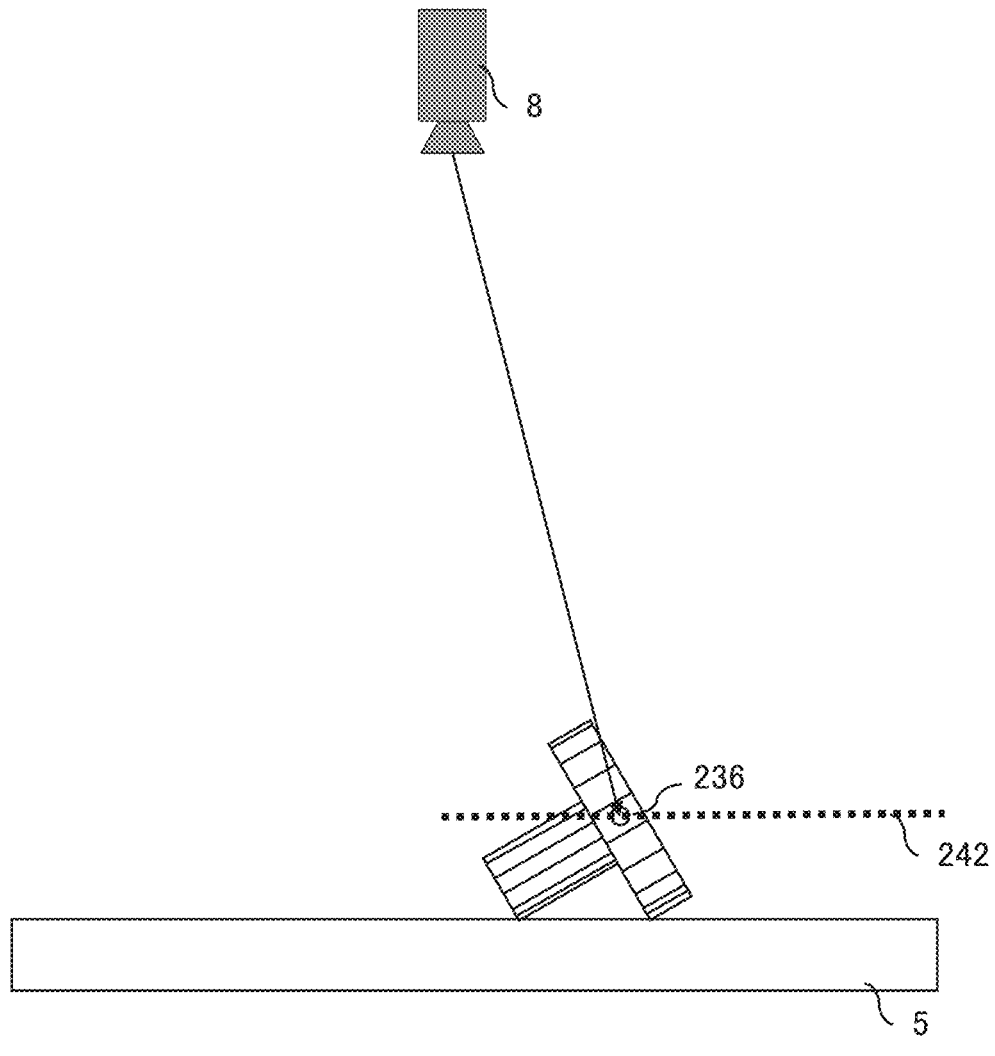
FIG. 15 is an explanatory diagram of a method for obtaining a position in the three-dimensional space according to the first embodiment.
Figure 16:
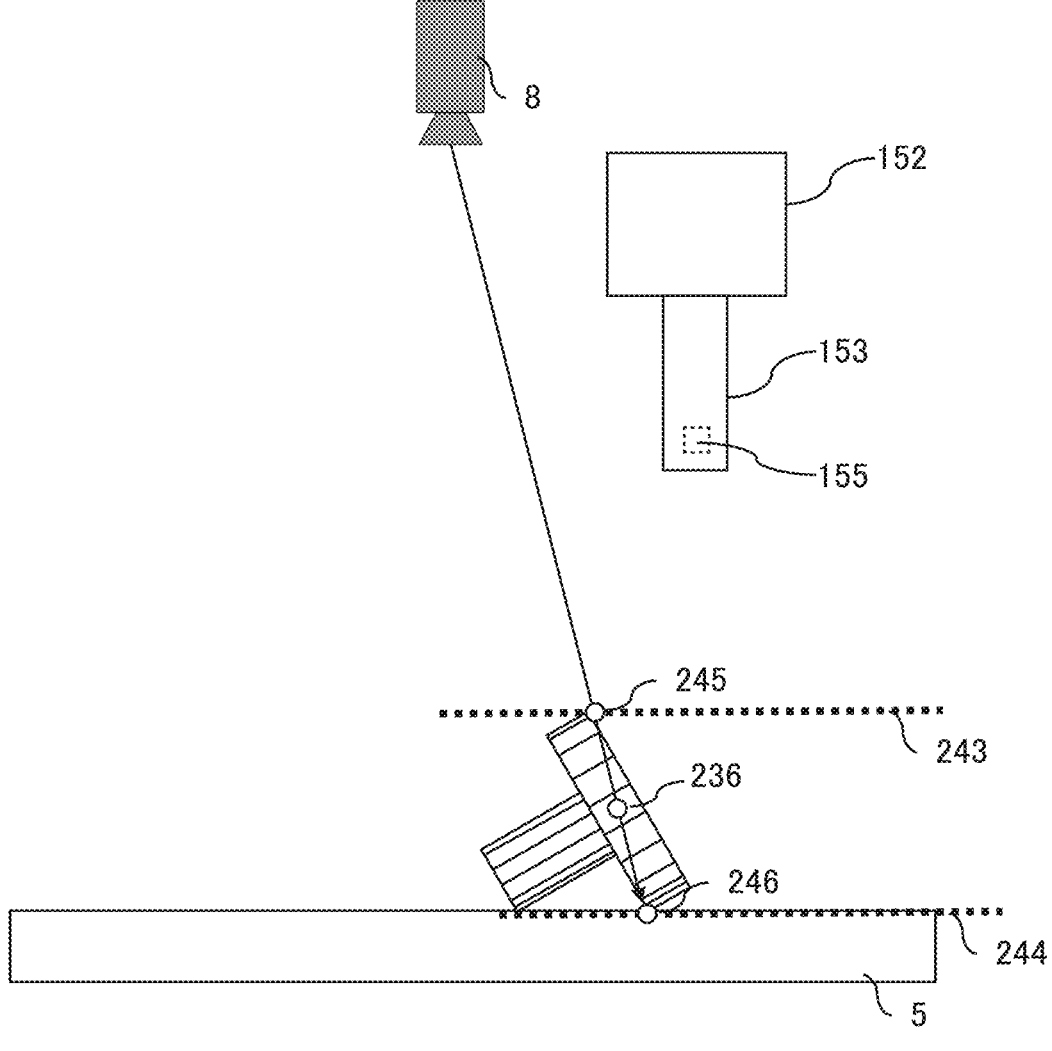
FIG. 16 is an explanatory diagram of a method for obtaining a position in the three-dimensional space according to the first embodiment.

FIGS. 14 to 16 are explanatory diagrams of methods for obtaining the position in the three-dimensional space according to the first embodiment. FIGS. 14 to 16 illustrate different methods, and one of these methods is implemented.

The method illustrated in FIG. 14 will be described. The holding pair P1 is no more than a holding pair in the image 11. Calculation in the depth direction in the three-dimensional space needs to be performed to convert the holding pair P1 that is information of the two-dimensional positions 2221 and 2251 into a holding position 236 where the robot 150 can take out the workpiece 3.

In the first embodiment, the inference portion 220 obtains the information of the position in a direction intersecting with the X-Y plane on the basis of the image 11 serving as the sensing data. Specifically, the inference portion 220 calculates a distance 241 in a depth direction from the vision sensor 8 by inference using the learned model 250. The inference portion 220 outputs, as output data, three-dimensional distance 241 from the vision sensor 8 to three-dimensional positions corresponding to the position candidates 2221 and 2251 of the holding pair P1.

The holding position calculation portion 230 converts the two-dimensional information of the positions 2221 and 2251 of the holding pair P1 into three-dimensional information by using the data of the distance 241, and thus calculates the holding position 236. As described above, the holding position 236 includes information of positions in the three-dimensional space of the finger portions 153 and 154 where the holding operation of causing the finger portions 153 and 154 of the robot hand 152 to hold a workpiece is started, information of a direction of the finger portions 153 and 154, and information of the width (holding width) between the finger portions 153 and 154.

The method illustrated in FIG. 15 will be described. In this method, the holding position calculation portion 230 calculates the holding position 236 by assuming that the three-dimensional positions of the workpiece 3 corresponding to the positions 2221 and 2251 are on a virtual surface 242 that is a virtual flat surface or a virtual curved surface.

Alternatively, in the case where the vision sensor 8 has a three-dimensional distance measurement function, the holding position calculation portion 230 obtains a result (distance measurement information) of measuring the distance from the vision sensor 8 to the workpiece 3, and obtains the information of the position (holding position 236) in a direction intersecting with the X-Y plane on the basis of the distance measurement information.

The method illustrated in FIG. 16 will be described. The controller 300 controls the robot 150 such that the finger portions 153 and 154 move in the three-dimensional space, and the holding position calculation portion 230 obtains the information of the position in the direction intersecting with the X-Y plane on the basis of a detection result of a sensor 155 that is a proximity sensor or the like provided at one of the finger portions 153 and 154. The sensor 155 is a sensor capable of detecting the presence or absence of a workpiece, and is provided on, for example, the inner side (side opposing the finger portion 154) of the finger portion 153.

Specifically, first, the holding position calculation portion 230 sets a plane 243 of an upper limit and a plane 244 of a lower limit of the workpiece to be taken out. The planes 243 and 244 are virtual planes set in the three-dimensional space. Then, the holding position calculation portion 230 calculates a holding position 245 and a holding position 246 respectively corresponding to cases where the holding pair P1 is projected onto the plane 243 and the plane 244.

In the holding operation of the actual workpiece 3, the controller 300 first moves the robot hand 152 to the holding position 245, and then slowly moves the robot hand 152 from the holding position 245 to the holding position 246. At this time, the controller 300 detects the presence or absence of the workpiece 3 by a sensor such as a proximity sensor attached to the inner side of a finger of the robot hand 152, stops the robot hand 152 when the robot hand 152 has reached the predetermined holding position 236, and performs the holding operation at the stopped position. The approach direction of the robot hand 152 is preferably a linear direction from the vision sensor 8 to the holding position 236.

Figure 17:
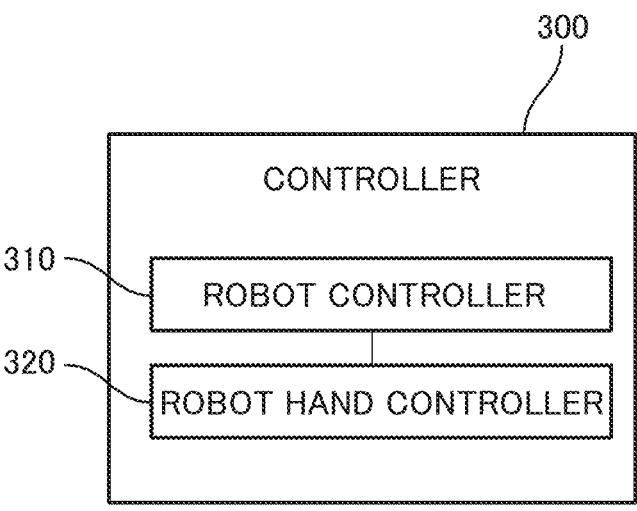
FIG. 17 is an explanatory diagram of a controller according to the first embodiment.

FIG. 17 is an explanatory diagram of the controller 300 according to the first embodiment. The controller 300 includes a robot controller 310 and a robot hand controller 320. The robot controller 310 controls the operation of the robot arm 151 on the basis of the information of the holding position 236 calculated by the information processing portion 200. The holding position 236 includes information of the position in the three-dimensional space as described above. The robot hand controller 320 controls the robot hand 152 on the basis of the information of the holding width included in the holding position 236 calculated by the information processing portion 200, and thus causes the robot hand 152 to hold a workpiece and release the held workpiece.

As described above, according to the first embodiment, in the learning phase, the learned model 250 is generated by causing the information processing portion 200 to perform machine learning by using a region including many positions as correct answer data instead of using each individual position as correct answer data, which reduces the variations of the correct answer data, and therefore the precision of the learning can be improved. Further, in the inference phase, since the information processing portion 200 performs inference by using the learned model 250 configured in this manner, a unique inference result can be obtained as a region including many positions, and thus the precision of the inference can be improved.

For example, in the case of imaging the workpiece from the bottom portion side of the cylindrical portion as in the case of the workpiece 4, the workpiece 4 is imaged as the workpiece image 4I of a cylindrical shape in the image 11 obtained by the imaging as illustrated in FIG. 3. In such a case, the robot hand 152 including the two finger portions 153 and 154 is capable of holding the workpiece 4 at many positions within 360° around the holding center point of the cylindrical portion. In the first embodiment, since the regions 226 and 227 including a plurality of positions that the finger portions 153 and 154 can enter are learned by the information processing portion 200 instead of the holding center by machine learning, the information processing portion 200 can perform the machine learning by using unique correct answer data expressing the whole area in the circumferential direction of the cylindrical portion for the same input data among a plurality of pieces of input data. Since the information processing portion 200 performs inference by using the learned model 250 configured in this manner, a unique inference result can be obtained as the regions 226 and 227 including many positions, and thus the precision of the inference can be improved.

In addition, for example, in the case of imaging the upper portion 31 and the lower portion 32 from the side as in the case of the workpiece 3, the workpiece 3 is imaged as the workpiece image 3I constituted by two portions having different widths in the image 11 obtained by the imaging as illustrated in FIG. 3. In such a case, the robot hand 152 including the two finger portions 153 and 154 is capable of holding the workpiece 3 at a plurality of positions on the upper portion 31 and the lower portion 32. In the first embodiment, since the regions 222 to 225 including a plurality of positions that the finger portions 153 and 154 can enter are learned by the information processing portion 200 by machine learning, the information processing portion 200 can perform the machine learning by using unique correct answer data expressing both the upper portion 31 and the lower portion 32 for the same input data among a plurality of pieces of input data. Further, since the information processing portion 200 performs inference by using the learned model 250 configured in this manner, a unique inference result can be obtained as the regions 222 to 225 including many positions, and thus the precision of the inference can be improved.

As described above, since unique correct answer data can be determined for the input data, the precision of the machine learning is improved, and as a result, the precision of the inference is improved. In addition, since a region that the finger portion 153 or 154 can enter is calculated, the precision of the inference determination can be improved. As a result of this, the success rate of holding of the workpiece by the robot 150 is improved, and the operability of the robot 150 is improved.

To be noted, although a case where the image 16 is generated by the inference portion 220 has been described above, the generation of the image 16 can be omitted if the information of the direction of the finger portion is unnecessary in the control of the robot hand 152.

In addition, although a case where the image 17 is generated by the inference portion 220 has been described above, the generation of the image 17 can be omitted if the information of the direction of the finger portion is unnecessary in the control of the robot hand 152.

Second Embodiment

The precision of interference determination is also low in the workpiece holding method using a three-dimensional shape matching technique and an interference determination technique using a point cloud. In this method, a position and orientation of a workpiece calculated by the three-dimensional shape matching technique is combined with information of a holding position set for the workpiece in advance, and thus the holding position for taking out the workpiece is determined. At this time, point cloud information is used to suppress interference between a finger portion of a robot hand with a workpiece different from the workpiece serving as a holding target or an object therearound. However, the point cloud information is easily affected by a defect and a blind spot, and therefore there is a case where the interference determination is not performed accurately. To be noted, examples of the "interference" include "collision".

A second embodiment will be described below. In the description below, it is assumed that elements denoted by the same reference signs as in the first embodiment have substantially the same configurations and functions as those described in the first embodiment unless otherwise described, and parts different from the first embodiment will be mainly described.

The hardware configuration of the robot system in the second embodiment is substantially the same as the hardware configuration of the robot system 1 of the first embodiment. That is, the processing of the information processing portion of the second embodiment is partially different from the processing of the information processing portion 200 described in the first embodiment. Part different from the first embodiment will be described below.

Figure 18:
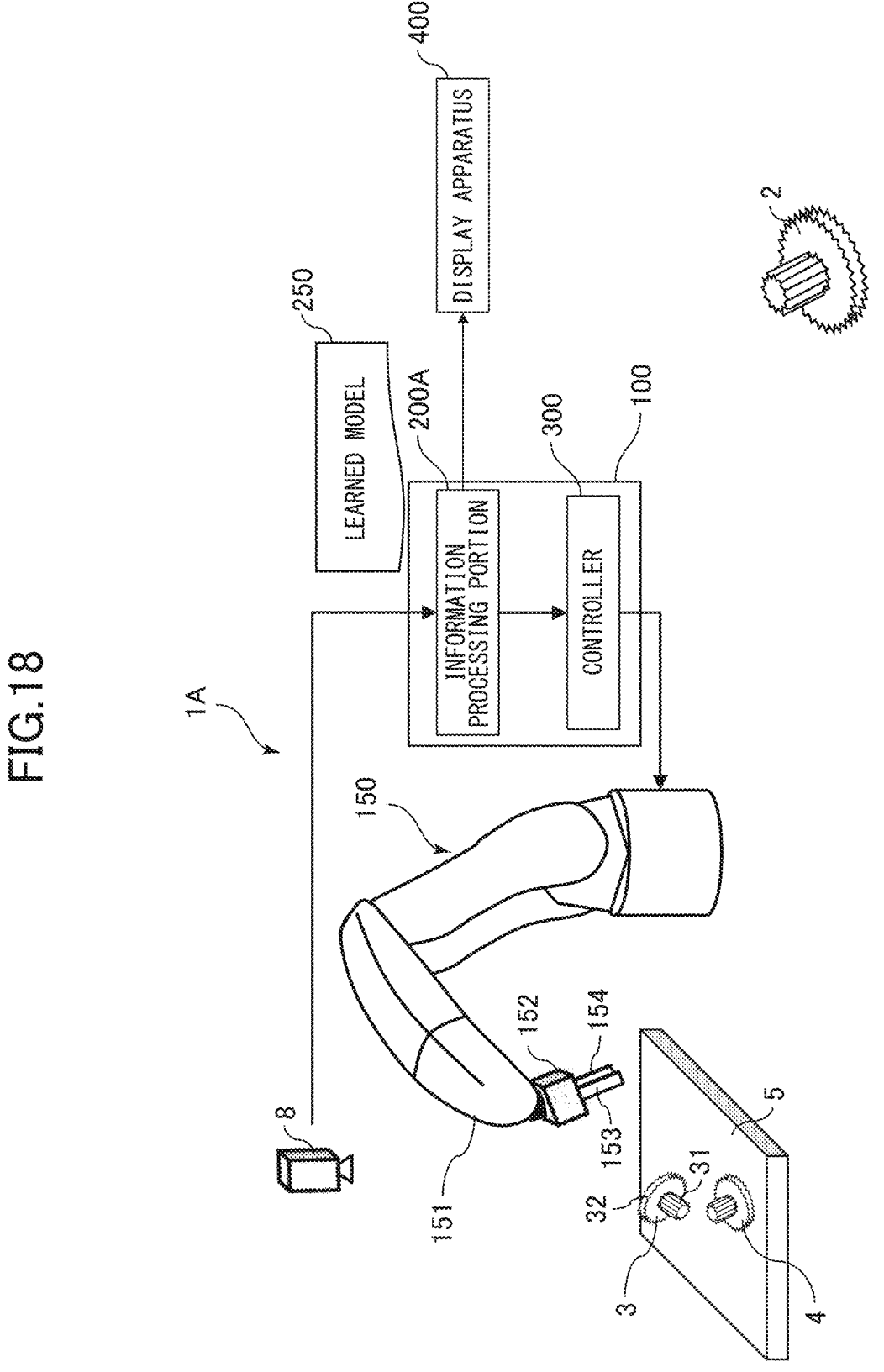
FIG. 18 is an explanatory diagram illustrating a schematic configuration of a robot system according to a second embodiment.

FIG. 18 is an explanatory diagram illustrating a schematic configuration of a robot system 1A according to the second embodiment. The robot system 1A includes the base 5, the vision sensor 8, the robot 150, the information processing apparatus 100, and the display apparatus 400. The information processing apparatus 100 includes an information processing portion 200A that performs information processing, and the controller 300 that controls the robot 150. The information processing portion 200A and the controller 300 are implemented by, for example, the CPU 121 illustrated in FIG. 2A executing the program 127. The workpieces 3 and 4 are disposed on the base 5.

In the first embodiment described above, a method of calculating the holding position from information of the position of a finger portion or the like has been described. In the second embodiment, a method in which the information processing portion 200A determines, on the basis of, for example, the image 13 illustrated in FIG. 4, whether or not the finger portions 153 and 154 can take out a workpiece without interfering with an object or the like therearound in the holding position calculated by a method different from the method described in the first embodiment. As a result of this, the problem of interference can be solved.

Figure 19:
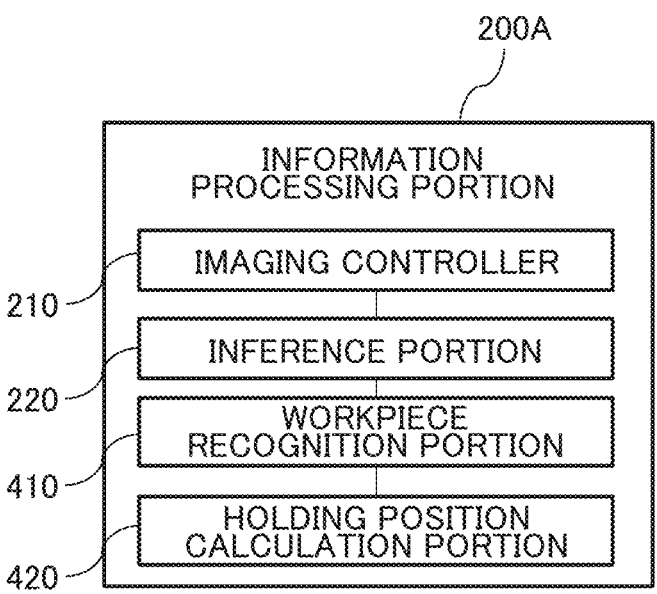
FIG. 19 is an explanatory diagram of the information processing portion according to the second embodiment.

FIG. 19 is an explanatory diagram of the information processing portion 200A according to the second embodiment. The information processing portion 200A includes the imaging controller 210, the inference portion 220, a workpiece recognition portion 410, and a holding position calculation portion 420.

The functions of the imaging controller 210 and the inference portion 220 are as described in the first embodiment.

The workpiece recognition portion 410 recognizes the position and orientation in the three-dimensional space of the workpieces 3 and 4 from the image 11 obtained from the imaging controller 210, and outputs the information of the position and orientation. For example, the workpiece recognition portion 410 performs matching by using a workpiece model that is three-dimensional information of the workpieces 3 and 4, and thus recognizes the position and orientation in the three-dimensional space of the workpieces 3 and 4.

The workpiece model may be any data as long as the workpiece model is a model corresponding to the workpieces 3 and 4. For example, the workpiece model is outline information of a computer-aided design (CAD) model, or three-dimensional point cloud information. The workpiece recognition portion 410 recognizes the position and orientation in the three-dimensional space of the workpiece by template matching using the outline information of the CAD model, three-dimensional matching using the three-dimensional point cloud information, or the like.

To be noted, the recognition method for the position and orientation of the workpieces 3 and 4 is not limited to these methods, and a known method different from the methods described above may be used.

Figure 20:
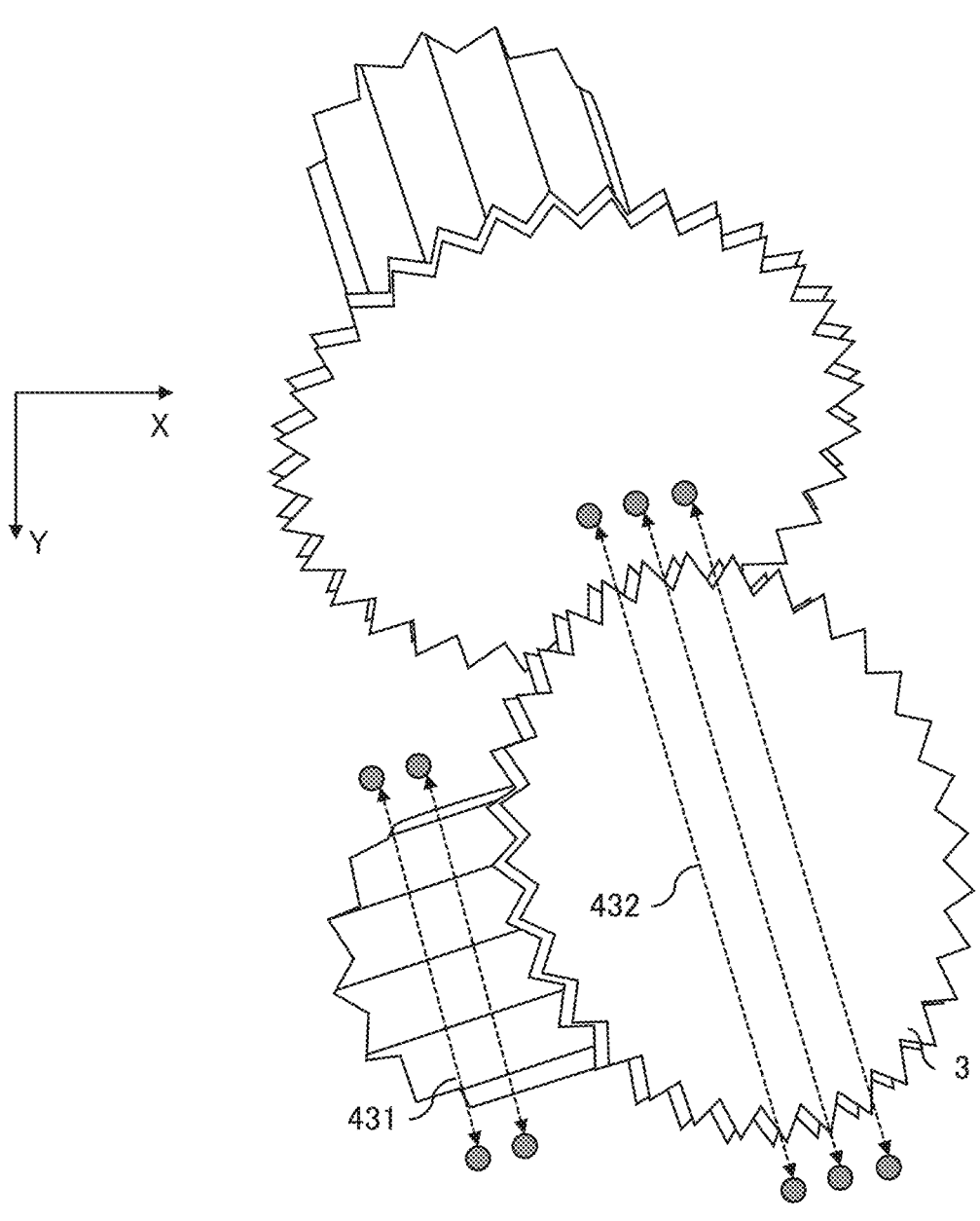
FIG. 20 is an explanatory diagram of a holding position calculation portion according to the second embodiment.
Figure 21:
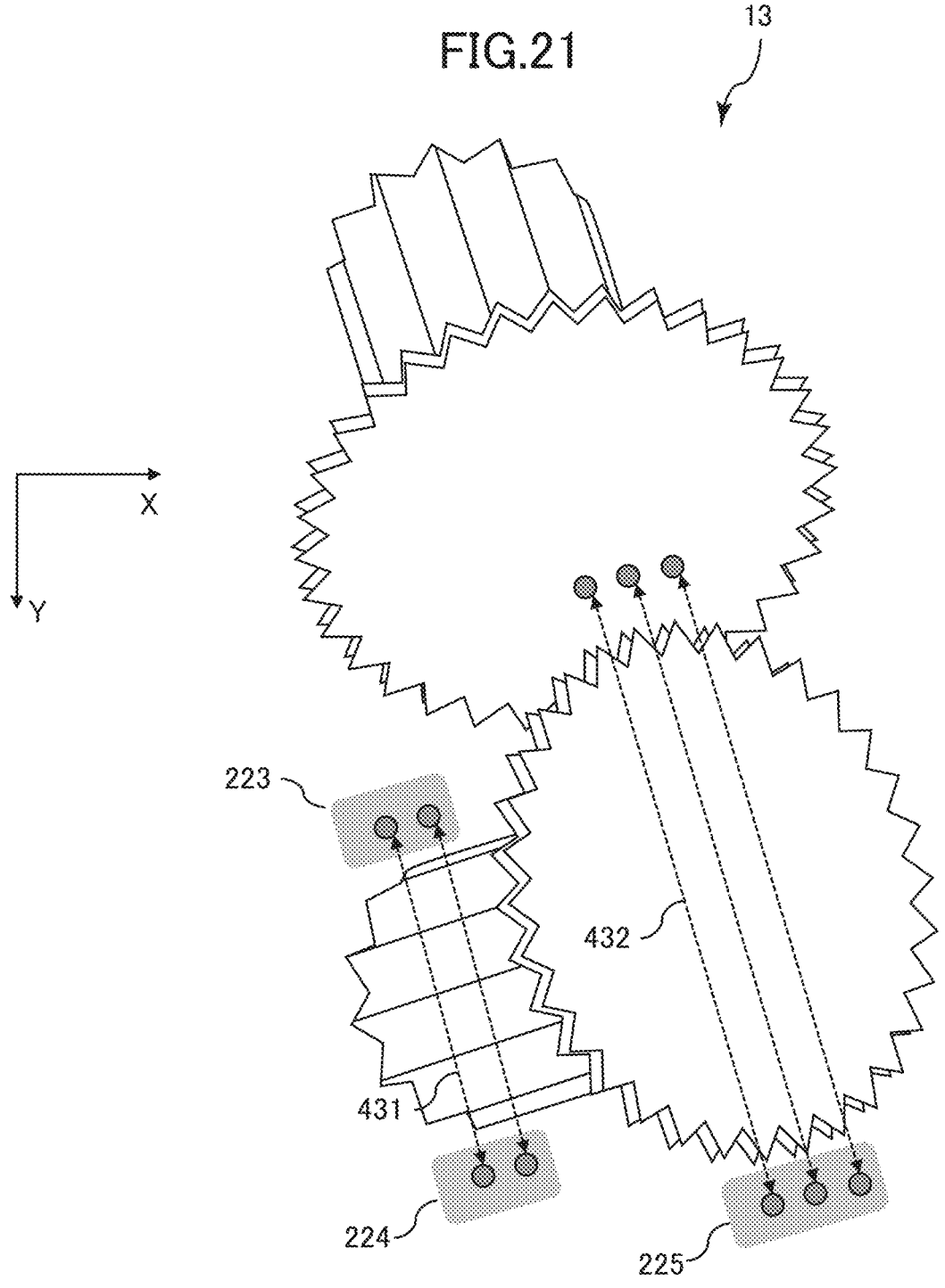
FIG. 21 is an explanatory diagram of the holding position calculation portion according to the second embodiment.

FIGS. 20 and 21 are explanatory diagrams of the holding position calculation portion 420 according to the second embodiment. FIG. 20 schematically illustrates the workpiece 3 recognized by the workpiece recognition portion 410, and holding positions 431 and 432 in the three-dimensional space with respect to the position and orientation of the workpiece 3.

The calculation method for the holding positions 431 and 432 will be described. First, the holding position calculation portion 420 calculates a two-dimensional holding position by using a known technique. Then, the holding position calculation portion 420 calculates the holding positions 431 and 432 in the three-dimensional space from the combination of the position and orientation in the three-dimensional space of the workpiece 3 calculated by using the workpiece recognition portion 410 and the two-dimensional holding position.

That is, the holding position calculation portion 420 obtains the holding positions 431 and 432 on the basis of the position and orientation in the three-dimensional space of the workpieces 3 and 4 recognized by the workpiece recognition portion 410. The holding positions 431 and 432 are each a group including two position candidates in the three-dimensional space corresponding to the two finger portions 153 and 154. As described above, the holding position calculation portion 420 obtains one or more groups.

In the holding positions 431 and 432 calculated by this method, there is a possibility that the finger portions 153 and 154 of the robot hand 152 come into contact with a workpiece or the like around the workpiece 3 serving as the holding target when taking out the workpiece 3. For example, among the holding positions 431 and 432, although the finger portion 153 or 154 of the robot hand 152 does not interfere with a workpiece around the workpiece 3 at the holding position 431, the finger portion 153 or 154 of the robot hand 152 interferes with the workpiece around the workpiece 3 at the holding position 432.

FIG. 21 illustrates an image in which the holding positions 431 and 432 are superimposed on, for example, the image 13 illustrated in FIG. 4, and the holding position calculation portion 420 displays an image illustrated in FIG. 21 on the display apparatus 400. To be noted, the image 13 is different from that in the first embodiment in that, among the regions 222 to 225 illustrated in FIG. 5, another workpiece is present in the region 222, and therefore the regions 223 to 225 are obtained by inference. That is, the inference portion 220 outputs the image 13 including the regions 223 to 225 where the finger portion 153 or 154 does not collide with an object around the workpiece 3 as output data.

In FIG. 21, at the holding position 431, there are the regions 223 and 224 that the finger portion 153 or 154 can enter, and at the holding position 432, there is the region 225 that one of the two finger portions 153 and 154 can enter, but there is not a region that the other of the two finger portions 153 and 154 can enter. As a result of this, the holding position calculation portion 420 outputs the information of the holding position 431 including the information of the positions in the three-dimensional space of the finger portions 153 and 154.

As described above, the holding position calculation portion 420 extracts the holding position 431 included in the regions 223 to 225 from the holding positions 431 and 432, and obtains the information of the position in the three-dimensional space of each of the finger portions 153 and 154 on the basis of the extracted holding position 431.

By performing such processing, the holding position 431 where the finger portions 153 and 154 of the robot hand 152 do not interfere with an object other than the workpiece serving as the holding target can be obtained even in a state in which a plurality of workpieces are randomly disposed on the base 5. To be noted, in such interference determination, whether or not the holding position satisfies the conditions may be determined by using the information of the images 16 and 17 of the finger portions in addition to the image 13.

As described above, according to the second embodiment, a region that the finger portion 153 or 154 can enter is calculated by inference by the inference portion 220, and therefore interference determination can be performed with higher precision in combination with machine learning technology and matching technology. As a result, the success rate of holding of the workpiece can be improved.

To be noted, at least one of the first embodiment and modifications examples of the first embodiment may be combined with the second embodiment or modification examples of the second embodiment.

According to the present disclosure, a technique advantageous for improving the precision of inference can be provided.

The present disclosure is not limited to the embodiments described above, and the embodiment can be modified in many ways within the technical concept of the present disclosure. For example, among the plurality of embodiments and plurality of modification examples described above, at least two may be combined. In addition, the effects described in the embodiments are merely enumeration of the most preferable effects that can be obtained from the embodiments of the present disclosure, and the effects of the embodiments of the present disclosure are not limited to those described in the present embodiment.

Although a case where the robot arm 151 is a vertically articulated robot arm has been described in the embodiments described above, the configuration is not limited to this. The robot arm 151 may be, for example, a horizontally articulated robot arm, a parallel link robot arm, or an orthogonal robot. In addition, the present disclosure is applicable to a machine that is capable of automatically performing extension, contraction, bending, vertical movement, horizontal movement, turning, or a composite operation of these on the basis of information in a storage device provided in the control apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166528, filed Sep. 27, 2023, which is hereby incorporated by reference herein in its entirety.

What is claimed is:

1. An information processing apparatus comprising an information processing portion configured to perform information processing, wherein the information processing portion is configured to:

obtain sensing data from a vision sensor having sensed a workpiece;

use the sensing data as input data for a learned model;

obtain, on a basis of the learned model, information of a region indicating a plurality of positions that are possible positions of a first finger portion among at least two finger portions included in a robot in a case of causing the at least two finger positions to perform a holding operation of holding the workpiece, and input, as the input data and to the learned model, data obtained by adding color serving as at least part of the region and a change in the color serving as information of a movement direction of the first finger portion to the sensing data.

2. The information processing apparatus according to claim 1, wherein the information processing portion is configured to obtain, for each of the positions in the region and on the basis of the learned model, information of a movement direction of the first finger portion in which the position serves as a starting point of the holding operation.

3. The information processing apparatus according to claim 1, wherein the information processing portion is configured to obtain, for each of the positions in the region and on the basis of the learned model, information of a distance from the first finger portion to a second finger portion among the at least two finger portions.

4. The information processing apparatus according to claim 1, wherein the sensing data is a captured image obtained by the vision sensor imaging the workpiece.

5. The information processing apparatus according to claim 1, wherein the region is a region that the first finger portion is capable of entering.

6. The information processing apparatus according to claim 5, wherein the region is a region where the first finger portion does not collide with an object around the workpiece in a case where the first finger portion enters the region.

7. The information processing apparatus according to claim 4, wherein output data obtained by the learned model is information defined in a predetermined plane that is the same plane as a plane of the captured image.

8. The information processing apparatus according to claim 7, wherein the information processing portion is configured to obtain, as the output data, the information of the region, information of a first component, and information of a second component, the information of the first component indicating distance from the first finger portion to a second finger portion among the at least two finger portions in a first direction for each of the positions in the region, the information of the second component indicating distance from the first finger portion to the second finger portion in a second direction intersecting with the first direction for each of the positions in the region.

9. The information processing apparatus according to claim 8, wherein the information processing portion is configured to obtain, for each of the positions in the region and by using the information of the region, the information of the first component, and the information of the second component, information of a movement direction of the first finger portion in which the position serves as a starting point of the holding operation.

10. The information processing apparatus according to claim 9, wherein the information processing portion is configured to obtain, by using the information of the region, the information of the first component, and the information of the second component, information of a distance between the first finger portion and a second finger portion among the at least two finger portions, for each of the positions in the region.

11. The information processing apparatus according to claim 8, wherein the information processing portion is configured to:

execute, by using the output data or information related to the output data, extraction processing of extracting a group including at least two position candidates corresponding to the at least two finger portions satisfying a predetermined condition from the plurality of positions in the region; and determine information of a position of each of the at least two finger portions on a basis of the extracted group in a case where extraction of the group in the extraction processing is successful.

12. The information processing apparatus according to claim 11, further comprising:

a controller configured to control the robot, wherein in a case where the extraction of the group in the extraction processing by the information processing portion is not successful, the controller controls the robot such that the robot comes into contact with the workpiece.

13. The information processing apparatus according to claim 11, wherein the information processing portion is configured to obtain information of a position in a direction intersecting with the predetermined plane, and information of a position in a three-dimensional space corresponding to the determined information of the position of each of the at least two finger portions.

14. The information processing apparatus according to claim 13, wherein the information processing portion is configured to obtain the information of the position in the direction intersecting with the predetermined plane on the basis of the sensing data.

15. The information processing apparatus according to claim 13, wherein the information processing portion is configured to obtain the information of the position in the direction intersecting with the predetermined plane on a basis of a result of measuring a distance to the workpiece.

16. The information processing apparatus according to claim 13, further comprising:

a controller configured to control the robot, wherein the controller is configured to control the robot such that the at least two finger portions move, and wherein the information processing portion is configured to obtain the information of the position in the direction intersecting with the predetermined plane on a basis of a detection result of a sensor provided at one of the at least two finger portions and capable of detecting the workpiece.

17. The information processing apparatus according to claim 1, wherein the information processing portion is configured to:

recognize a position and orientation of the workpiece in a three-dimensional space from the sensing data;

obtain one or more groups including at least two position candidates corresponding to the at least two finger portions in the three-dimensional space on a basis of the recognized position and orientation of the workpiece in the three-dimensional space;

extract a group included in the region from the one or more groups; and obtain information of a position of each of the at least two finger portions in the three-dimensional space on a basis of the extracted group.

18. The information processing apparatus according to claim 13, further comprising:

a controller configured to control the robot, wherein the controller is configured to control the robot by using at least the information of the position in the three-dimensional space.

19. The information processing apparatus according to claim 17, wherein the information processing portion is configured to recognize the position and orientation of the workpiece in the three-dimensional space by matching with a workpiece model corresponding to the workpiece.

20. The information processing apparatus according to claim 1, wherein the information processing portion is configured to display, on a display portion, an image based on the information of the region.

21. The information processing apparatus according to claim 20, wherein the information processing portion is configured to display an image based on the sensing data and the image based on the information of the region in a state of being superimposed on each other on the display portion.

22. The information processing apparatus according to claim 20, wherein the information processing portion is configured to:

obtain, for each of the positions in the region and on the basis of the learned model, information of a movement direction of the first finger portion in which the position serves as a starting point of the holding operation; and display the image based on the information of the region on the display portion in a manner differing in accordance with the movement direction.

23. The information processing apparatus according to claim 20, wherein the information processing portion is configured to:

obtain, for each of the positions in the region and on the basis of the learned model, information of a distance from the first finger portion to a second finger portion among the at least two finger portions; and display the image based on the information of the region on the display portion in a manner differing in accordance with the distance.

24. The information processing apparatus according to claim 1, wherein the information processing portion is configured to generate the learned model by supervised learning.

25. An information processing apparatus comprising an information processing portion configured to perform information processing, wherein the information processing portion is configured to:

obtain sensing data from a vision sensor having sensed a workpiece;

use the sensing data as input data for a learned model;

obtain, on a basis of the learned model, information of a region indicating a plurality of positions that are possible positions of a first finger portion among at least two finger portions included in a robot in a case of causing the at least two finger positions to perform a holding operation of holding the workpiece; and display, on a display portion, data obtained by adding color serving as at least part of the region and a change in the color serving as information of a movement direction of the first finger portion to the sensing data.

26. An information processing method for performing information processing, the information processing method comprising:

obtaining sensing data from a vision sensor having sensed a workpiece;

using the sensing data as input data for a learned model;

obtaining, on a basis of the learned model, information of a region indicating a plurality of positions that are possible positions of a first finger portion among at least two finger portions included in a robot in a case of causing the at least two finger positions to perform a holding operation of holding the workpiece; and inputting, as the input data and to the learned model, data obtained by adding color serving as at least part of the region and a change in the color serving as information of a movement direction of the first finger portion to the sensing data.

27. A robot system comprising:

the information processing apparatus according to claim 1; and a robot including at least two finger portions controlled by the information processing apparatus.

28. A robot system comprising:

the information processing apparatus according to claim 1;

a robot including at least two finger portions; and a controller configured to control the robot to cause the at least two finger portions to hold a workpiece, by using an information processing result of the information processing apparatus.

29. A method for manufacturing a product by using the robot system according to claim 28.

30. A non-transitory computer-readable recording medium storing a program for causing a computer to execute the information processing method according to claim 27.

31. An information processing method for performing information processing, the information processing method comprising:

obtaining sensing data from a vision sensor having sensed a workpiece;

using the sensing data as input data for a learned model;

obtaining, on a basis of the learned model, information of a region indicating a plurality of positions that are possible positions of a first finger portion among at least two finger portions included in a robot in a case of causing the at least two finger positions to perform a holding operation of holding the workpiece; and displaying, on a display portion, data obtained by adding color serving as at least part of the region and a change in the color serving as information of a movement direction of the first finger portion to the sensing data.

* * * * *